(12) United States Patent
Dutta

(10) Patent No.: US 11,736,392 B2
(45) Date of Patent: Aug. 22, 2023

(54) SUPPORTING STATEFUL EXPLICIT PATHS

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/380,837

(22) Filed: Jul. 20, 2021

(65) Prior Publication Data

US 2023/0024785 A1    Jan. 26, 2023

(51) Int. Cl.
*H04L 12/721* (2013.01)
*H04L 45/00* (2022.01)

(52) U.S. Cl.
CPC .................. *H04L 45/566* (2013.01)

(58) Field of Classification Search
CPC .................................................... H04L 45/566
See application file for complete search history.

(56) References Cited

U.S. PATENT DOCUMENTS

| | | | |
|---|---|---|---|
| 2017/0070455 A1* | 3/2017 | Zhang | H04L 65/40 |
| 2019/0297000 A1* | 9/2019 | Dutta | H04L 45/16 |
| 2020/0119991 A1* | 4/2020 | Dutta | H04L 65/70 |
| 2022/0166709 A1* | 5/2022 | Barman | H04L 45/566 |

FOREIGN PATENT DOCUMENTS

WO    WO 2019/239172 A1    12/2019

OTHER PUBLICATIONS

Moy, J., "OSPF Version 2," IETF, RFC 2328, Apr. 1998, 244 pages.
Coltun, R., et al., "OSPF for IPv6," IETF, RFC 5340, Jul. 2008, 94 pages.
Callon, R., et al., "Use of OSI IS-IS for Routing in TCP/IP and Dual Environments," IETF, RFC 1195, Dec. 1990, 68 pages.
Gredler, H., et al., "North-Bound Distribution of Link-State and Traffic Engineering (TE) Information Using BGP," IETF, RFC 7752, Mar. 2016, 48 pages.
Filsfils, C., et al., "Segment Routing Architecture," IETF, RFC 8402, Jul. 2018, 32 pages.

(Continued)

*Primary Examiner* — Jung H Park
(74) *Attorney, Agent, or Firm* — Tong, Rea, Bentley & Kim, LLC

(57) ABSTRACT

Various example embodiments for supporting stateful explicit paths are presented herein. Various example embodiments for supporting stateful explicit paths may be configured to support communication of a packet along a path in an Internet Protocol (IP) network from a first node to a second node, wherein the path includes a set of hops, wherein the packet includes a tuple configured to identify the path, wherein the tuple includes a first IP address of the first node, a second IP address of the second node, and a path identifier of the path, wherein the path identifier of the path is a unique identifier assigned to the path, wherein the communication of the packet along the path from the first node to the second node is supported based on state information configured to map the tuple to a next hop in the set of hops of the path.

22 Claims, 18 Drawing Sheets

(56) References Cited

OTHER PUBLICATIONS

Filsfils, C., et al., "IPv6 Segment Routing Header (SRH)," IETF, RFC 8754, Mar. 2020, 27 pages.
Awduche, D., et al., "RSVP-TE: Extensions to RSVP for LSP Tunnels," IETF, RFC 3209, Dec. 2001, 61 pages.
IETF, "Internet Protocol—DARPA Internet Program—Protocol Specification," IETF, RFC 791, Sep. 1981, 51 pages.
Deering, S., "Internet Protocol, Version 6 (IPv6) Specification," IETF, RFC 2460, Dec. 1998, 39 pages.
Subedi, et al., "SDN-based fault-tolerant on-demand and in-advance bandwidth reservation in data center interconnects," International Journal of Communication Systems, vol. 31, No. 4, Dec. 7, 2017, 21 pages.
EP Search Report mailed in corresponding EP Application No. 22183693.5 dated Nov. 22, 2022, 9 pages.

\* cited by examiner

HOP-BY-HOP OPTIONS HEADER 1600

TLV-ENCODED OPTION 1700

PATH-ID OPTION 1800

SUPPORTING STATEFUL EXPLICIT PATHS

TECHNICAL FIELD

Various example embodiments relate generally to communications and, more particularly but not exclusively, to supporting communications based on stateful explicit paths.

BACKGROUND

In various contexts, various communications technologies may be used to support various types of communications.

SUMMARY

In at least some example embodiments, an apparatus includes at least one processor and at least one memory including computer program code, wherein the at least one memory and the computer program code are configured to, with the at least one processor, cause the apparatus at least to support communication of a packet along a path in an Internet Protocol (IP) network from a first node to a second node, wherein the path includes a set of hops, wherein the packet includes a tuple configured to identify the path, wherein the tuple includes a first IP address of the first node, a second IP address of the second node, and a path identifier of the path, wherein the path identifier of the path is a unique identifier assigned to the path, wherein the communication of the packet along the path from the first node to the second node is supported based on state information configured to map the tuple to a next hop in the set of hops of the path. In at least some example embodiments, the set of hops of the path includes a set of network elements of which the path is composed, wherein the set of network elements includes at least one of a set of nodes or a set of links. In at least some example embodiments, the path identifier is unique to the first node. In at least some example embodiments, the path identifier is unique within the IP network. In at least some example embodiments, the path identifier is assigned to the path by the first node. In at least some example embodiments, the path identifier is assigned to the path by a controller. In at least some example embodiments, to support communication of the packet, the at least one memory and the computer program code are configured to, with the at least one processor, cause the apparatus at least to send, by a node, a path setup message including the tuple configured to identify the path and a hops list including hop identifiers of the respective hops of the path. In at least some example embodiments, to support communication of the packet, the at least one memory and the computer program code are configured to, with the at least one processor, cause the apparatus at least to receive, by a node, a path setup message including the tuple configured to identify the path and a hops list including hop identifiers of the respective hops of the path and determine, by the node from a local perspective of the node based on the hops list, the next hop in set of hops of the path. In at least some example embodiments, the path setup message includes a pointer configured to point to a current hop in the hops list, wherein the next hop in the set of hops of the path is determined based on the pointer. In at least some example embodiments, the path setup message includes an indication of resources to be reserved on the next hop in the set of hops of the path. In at least some example embodiments, to support communication of the packet, the at least one memory and the computer program code are configured to, with the at least one processor, cause the apparatus at least to maintain, by the node based on a determination that the next hop in the set of hops of the path is capable of supporting the resources to be reserved on the next hop in the set of hops of the path, the state information configured to map the tuple to the next hop in the set of hops of the path. In at least some example embodiments, to support communication of the packet, the at least one memory and the computer program code are configured to, with the at least one processor, cause the apparatus at least to send, by the node toward an upstream node of the path from which the path setup message is received based on a determination that the next hop in the set of hops of the path is not capable of supporting the resources to be reserved on the next hop in the set of hops of the path, an error message indicative of a failure to establish the path. In at least some example embodiments, to support communication of the packet, the at least one memory and the computer program code are configured to, with the at least one processor, cause the apparatus at least to maintain, by the node, the state information configured to map the tuple to the next hop in the set of hops of the path. In at least some example embodiments, to support communication of the packet, the at least one memory and the computer program code are configured to, with the at least one processor, cause the apparatus at least to receive, based on a control protocol, the state information configured to map the tuple to the next hop in the set of hops of the path and store the state information configured to map the tuple to the next hop in the set of hops of the path. In at least some example embodiments, to support communication of the packet, the at least one memory and the computer program code are configured to, with the at least one processor, cause the apparatus at least to receive, by a node, the packet, determine, by the node based on the tuple from the packet and based on the state information configured to map the tuple to the next hop in the set of hops of the path, the next hop in the set of hops of the path, and send, by the node toward the next hop in the set of hops of the path, the packet. In at least some example embodiments, to support communication of the packet, the at least one memory and the computer program code are configured to, with the at least one processor, cause the apparatus at least to receive, by a node, the packet, determine, by the node based on the tuple from the packet and based on the state information configured to map the tuple to the next hop in the set of hops of the path, that the node is the second node of the path, and perform, by the node, processing for removing the packet from the path. In at least some example embodiments, to perform processing for removing the packet from the path, the at least one memory and the computer program code are configured to, with the at least one processor, cause the apparatus at least to remove, by the node from the packet to form a new packet having a native header as an outer header, a header including the tuple and process, by the node based on the native header, the resultant packet. In at least some example embodiments, the at least one memory and the computer program code are configured to, with the at least one processor, cause the apparatus at least to support communication of a second packet along a second path from the first node to the second node in the network, wherein the second path traverses the set of hops, wherein the second packet includes a second tuple configured to identify the second path, wherein the second tuple includes the first IP address of the first node, the second IP address of the second node, and a second path identifier of the second path, wherein the communication of the second packet is supported based on second state information of the second path configured to map the second tuple to a next hop in the set of hops. In at least some example embodiments, the at least one memory and the computer program code are configured to, with the at least one processor, cause the apparatus at least to support communication of a second packet along a second path from the first node to the second node in the network, wherein the second path traverses a second set of hops which is different than the first set of hops of the first path, wherein the second packet includes a second tuple configured to identify the second path, wherein the second tuple includes the first IP address of the first node, the second IP address of the second node, and a second path identifier of the second path, wherein the communication of the second packet is supported based on second state information of the second path configured to map the second tuple to a next hop in the second set of hops of the second path.

In at least some example embodiments, a computer readable medium stores computer program code configured to cause an apparatus at least to support communication of a packet along a path in an Internet Protocol (IP) network from a first node to a second node, wherein the path includes a set of hops, wherein the packet includes a tuple configured to identify the path, wherein the tuple includes a first IP address of the first node, a second IP address of the second node, and a path identifier of the path, wherein the path identifier of the path is a unique identifier assigned to the path, wherein the communication of the packet along the path from the first node to the second node is supported based on state information configured to map the tuple to a next hop in the set of hops of the path. In at least some example embodiments, the set of hops of the path includes a set of network elements of which the path is composed, wherein the set of network elements includes at least one of a set of nodes or a set of links. In at least some example embodiments, the path identifier is unique to the first node. In at least some example embodiments, the path identifier is unique within the IP network. In at least some example embodiments, the path identifier is assigned to the path by the first node. In at least some example embodiments, the path identifier is assigned to the path by a controller. In at least some example embodiments, to support communication of the packet, the computer program code is configured to cause the apparatus at least to send, by a node, a path setup message including the tuple configured to identify the path and a hops list including hop identifiers of the respective hops of the path. In at least some example embodiments, to support communication of the packet, the computer program code is configured to cause the apparatus at least to receive, by a node, a path setup message including the tuple configured to identify the path and a hops list including hop identifiers of the respective hops of the path and determine, by the node from a local perspective of the node based on the hops list, the next hop in set of hops of the path. In at least some example embodiments, the path setup message includes a pointer configured to point to a current hop in the hops list, wherein the next hop in the set of hops of the path is determined based on the pointer. In at least some example embodiments, the path setup message includes an indication of resources to be reserved on the next hop in the set of hops of the path. In at least some example embodiments, to support communication of the packet, the computer program code is configured to cause the apparatus at least to maintain, by the node based on a determination that the next hop in the set of hops of the path is capable of supporting the resources to be reserved on the next hop in the set of hops of the path, the state information configured to map the tuple to the next hop in the set of hops of the path. In at least some example embodiments, to support communication of the packet, the computer program code is configured to cause the apparatus at least to send, by the node toward an upstream node of the path from which the path setup message is received based on a determination that the next hop in the set of hops of the path is not capable of supporting the resources to be reserved on the next hop in the set of hops of the path, an error message indicative of a failure to establish the path. In at least some example embodiments, to support communication of the packet, the computer program code is configured to cause the apparatus at least to maintain, by the node, the state information configured to map the tuple to the next hop in the set of hops of the path. In at least some example embodiments, to support communication of the packet, the computer program code is configured to cause the apparatus at least to receive, based on a control protocol, the state information configured to map the tuple to the next hop in the set of hops of the path and store the state information configured to map the tuple to the next hop in the set of hops of the path. In at least some example embodiments, to support communication of the packet, the computer program code is configured to cause the apparatus at least to receive, by a node, the packet, determine, by the node based on the tuple from the packet and based on the state information configured to map the tuple to the next hop in the set of hops of the path, the next hop in the set of hops of the path, and send, by the node toward the next hop in the set of hops of the path, the packet. In at least some example embodiments, to support communication of the packet, the computer program code is configured to cause the apparatus at least to receive, by a node, the packet, determine, by the node based on the tuple from the packet and based on the state information configured to map the tuple to the next hop in the set of hops of the path, that the node is the second node of the path, and perform, by the node, processing for removing the packet from the path. In at least some example embodiments, to perform processing for removing the packet from the path, the computer program code is configured to cause the apparatus at least to remove, by the node from the packet to form a new packet having a native header as an outer header, a header including the tuple and process, by the node based on the native header, the resultant packet. In at least some example embodiments, the computer program code is configured to cause the apparatus at least to support communication of a second packet along a second path from the first node to the second node in the network, wherein the second path traverses the set of hops, wherein the second packet includes a second tuple configured to identify the second path, wherein the second tuple includes the first IP address of the first node, the second IP address of the second node, and a second path identifier of the second path, wherein the communication of the second packet is supported based on second state information of the second path configured to map the second tuple to a next hop in the set of hops. In at least some example embodiments, the computer program code is configured to cause the apparatus at least to support communication of a second packet along a second path from the first node to the second node in the network, wherein the second path traverses a second set of hops which is different than the first set of hops of the first path, wherein the second packet includes a second tuple configured to identify the second path, wherein the second tuple includes the first IP address of the first node, the second IP address of the second node, and a second path identifier of the second path, wherein the communication of the second packet is supported based on second state information of the second path configured to map the second tuple to a next hop in the second set of hops of the second path.

In at least some example embodiments, a method includes supporting communication of a packet along a path in an Internet Protocol (IP) network from a first node to a second node, wherein the path includes a set of hops, wherein the packet includes a tuple configured to identify the path, wherein the tuple includes a first IP address of the first node, a second IP address of the second node, and a path identifier of the path, wherein the path identifier of the path is a unique identifier assigned to the path, wherein the communication of the packet along the path from the first node to the second node is supported based on state information configured to map the tuple to a next hop in the set of hops of the path. In at least some example embodiments, the set of hops of the path includes a set of network elements of which the path is composed, wherein the set of network elements includes at least one of a set of nodes or a set of links. In at least some example embodiments, the path identifier is unique to the first node. In at least some example embodiments, the path identifier is unique within the IP network. In at least some example embodiments, the path identifier is assigned to the path by the first node. In at least some example embodiments, the path identifier is assigned to the path by a controller. In at least some example embodiments, supporting communication of the packet includes sending, by a node, a path setup message including the tuple configured to identify the path and a hops list including hop identifiers of the respective hops of the path. In at least some example embodiments, supporting communication of the packet includes receiving, by a node, a path setup message including the tuple configured to identify the path and a hops list including hop identifiers of the respective hops of the path and determining, by the node from a local perspective of the node based on the hops list, the next hop in set of hops of the path. In at least some example embodiments, the path setup message includes a pointer configured to point to a current hop in the hops list, wherein the next hop in the set of hops of the path is determined based on the pointer. In at least some example embodiments, the path setup message includes an indication of resources to be reserved on the next hop in the set of hops of the path. In at least some example embodiments, supporting communication of the packet includes maintaining, by the node based on a determination that the next hop in the set of hops of the path is capable of supporting the resources to be reserved on the next hop in the set of hops of the path, the state information configured to map the tuple to the next hop in the set of hops of the path. In at least some example embodiments, supporting communication of the packet includes sending, by the node toward an upstream node of the path from which the path setup message is received based on a determination that the next hop in the set of hops of the path is not capable of supporting the resources to be reserved on the next hop in the set of hops of the path, an error message indicative of a failure to establish the path. In at least some example embodiments, supporting communication of the packet includes maintaining, by the node, the state information configured to map the tuple to the next hop in the set of hops of the path. In at least some example embodiments, supporting communication of the packet includes receiving, based on a control protocol, the state information configured to map the tuple to the next hop in the set of hops of the path and storing the state information configured to map the tuple to the next hop in the set of hops of the path. In at least some example embodiments, supporting communication of the packet includes receiving, by a node, the packet, determining, by the node based on the tuple from the packet and based on the state information configured to map the tuple to the next hop in the set of hops of the path, the next hop in the set of hops of the path, and sending, by the node toward the next hop in the set of hops of the path, the packet. In at least some example embodiments, supporting communication of the packet includes receiving, by a node, the packet, determining, by the node based on the tuple from the packet and based on the state information configured to map the tuple to the next hop in the set of hops of the path, that the node is the second node of the path, and performing, by the node, processing for removing the packet from the path. In at least some example embodiments, performing processing for removing the packet from the path includes removing, by the node from the packet to form a new packet having a native header as an outer header, a header including the tuple and processing, by the node based on the native header, the resultant packet. In at least some example embodiments, the method includes supporting communication of a second packet along a second path from the first node to the second node in the network, wherein the second path traverses the set of hops, wherein the second packet includes a second tuple configured to identify the second path, wherein the second tuple includes the first IP address of the first node, the second IP address of the second node, and a second path identifier of the second path, wherein the communication of the second packet is supported based on second state information of the second path configured to map the second tuple to a next hop in the set of hops. In at least some example embodiments, the method includes supporting communication of a second packet along a second path from the first node to the second node in the network, wherein the second path traverses a second set of hops which is different than the first set of hops of the first path, wherein the second packet includes a second tuple configured to identify the second path, wherein the second tuple includes the first IP address of the first node, the second IP address of the second node, and a second path identifier of the second path, wherein the communication of the second packet is supported based on second state information of the second path configured to map the second tuple to a next hop in the second set of hops of the second path.

In at least some example embodiments, an apparatus includes means for supporting communication of a packet along a path in an Internet Protocol (IP) network from a first node to a second node, wherein the path includes a set of hops, wherein the packet includes a tuple configured to identify the path, wherein the tuple includes a first IP address of the first node, a second IP address of the second node, and a path identifier of the path, wherein the path identifier of the path is a unique identifier assigned to the path, wherein the communication of the packet along the path from the first node to the second node is supported based on state information configured to map the tuple to a next hop in the set of hops of the path. In at least some example embodiments, the set of hops of the path includes a set of network elements of which the path is composed, wherein the set of network elements includes at least one of a set of nodes or a set of links. In at least some example embodiments, the path identifier is unique to the first node. In at least some example embodiments, the path identifier is unique within the IP network. In at least some example embodiments, the path identifier is assigned to the path by the first node. In at least some example embodiments, the path identifier is assigned to the path by a controller. In at least some example embodiments, supporting communication of the packet includes means for sending, by a node, a path setup message including the tuple configured to identify the path and a hops list including hop identifiers of the respective hops of the path. In at least some example embodiments, the means for supporting communication of the packet includes means for receiving, by a node, a path setup message including the tuple configured to identify the path and a hops list including hop identifiers of the respective hops of the path and means for determining, by the node from a local perspective of the node based on the hops list, the next hop in set of hops of the path. In at least some example embodiments, the path setup message includes a pointer configured to point to a current hop in the hops list, wherein the next hop in the set of hops of the path is determined based on the pointer. In at least some example embodiments, the path setup message includes an indication of resources to be reserved on the next hop in the set of hops of the path. In at least some example embodiments, the means for supporting communication of the packet includes means for maintaining, by the node based on a determination that the next hop in the set of hops of the path is capable of supporting the resources to be reserved on the next hop in the set of hops of the path, the state information configured to map the tuple to the next hop in the set of hops of the path. In at least some example embodiments, the means for supporting communication of the packet includes means for sending, by the node toward an upstream node of the path from which the path setup message is received based on a determination that the next hop in the set of hops of the path is not capable of supporting the resources to be reserved on the next hop in the set of hops of the path, an error message indicative of a failure to establish the path. In at least some example embodiments, the means for supporting communication of the packet includes means for maintaining, by the node, the state information configured to map the tuple to the next hop in the set of hops of the path. In at least some example embodiments, the means for supporting communication of the packet includes means for receiving, based on a control protocol, the state information configured to map the tuple to the next hop in the set of hops of the path and means for storing the state information configured to map the tuple to the next hop in the set of hops of the path. In at least some example embodiments, the means for supporting communication of the packet includes means for receiving, by a node, the packet, means for determining, by the node based on the tuple from the packet and based on the state information configured to map the tuple to the next hop in the set of hops of the path, the next hop in the set of hops of the path, and means for sending, by the node toward the next hop in the set of hops of the path, the packet. In at least some example embodiments, the means for supporting communication of the packet includes means for receiving, by a node, the packet, means for determining, by the node based on the tuple from the packet and based on the state information configured to map the tuple to the next hop in the set of hops of the path, that the node is the second node of the path, and means for performing, by the node, processing for removing the packet from the path. In at least some example embodiments, the means for performing processing for removing the packet from the path includes means for removing, by the node from the packet to form a new packet having a native header as an outer header, a header including the tuple and means for processing, by the node based on the native header, the resultant packet. In at least some example embodiments, the apparatus includes means for supporting communication of a second packet along a second path from the first node to the second node in the network, wherein the second path traverses the set of hops, wherein the second packet includes a second tuple configured to identify the second path, wherein the second tuple includes the first IP address of the first node, the second IP address of the second node, and a second path identifier of the second path, wherein the communication of the second packet is supported based on second state information of the second path configured to map the second tuple to a next hop in the set of hops. In at least some example embodiments, the apparatus includes means for supporting communication of a second packet along a second path from the first node to the second node in the network, wherein the second path traverses a second set of hops which is different than the first set of hops of the first path, wherein the second packet includes a second tuple configured to identify the second path, wherein the second tuple includes the first IP address of the first node, the second IP address of the second node, and a second path identifier of the second path, wherein the communication of the second packet is supported based on second state information of the second path configured to map the second tuple to a next hop in the second set of hops of the second path.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Various example embodiments for supporting stateful explicit paths are presented herein. Various example embodiments for supporting stateful explicit paths may be configured to support communication of a packet along a path from a first node to a second node, wherein the path includes a set of hops, wherein the packet includes a tuple configured to identify the path, wherein the tuple includes a first address of the first node, a second address of the second node, and a path identifier of the path, wherein the path identifier of the path is a unique identifier assigned to the path, wherein the communication of the packet along the path from the first node to the second node is supported based on state information configured to map the tuple to a next hop in the set of hops of the path. Various example embodiments for supporting stateful explicit paths may be configured to support communication of a packet along a path in an Internet Protocol (IP) network from a first node to a second node, wherein the path includes a set of hops, wherein the packet includes a tuple configured to identify the path, wherein the tuple includes a first IP address of the first node, a second IP address of the second node, and a path identifier of the path, wherein the path identifier of the path is a unique identifier assigned to the path, wherein the communication of the packet along the path from the first node to the second node is supported based on state information configured to map the tuple to a next hop in the set of hops of the path. It will be appreciated that these and various other example embodiments and advantages or potential advantages of supporting stateful explicit paths may be further understood by way of reference to the various figures, which are discussed further below.

Figure 1:
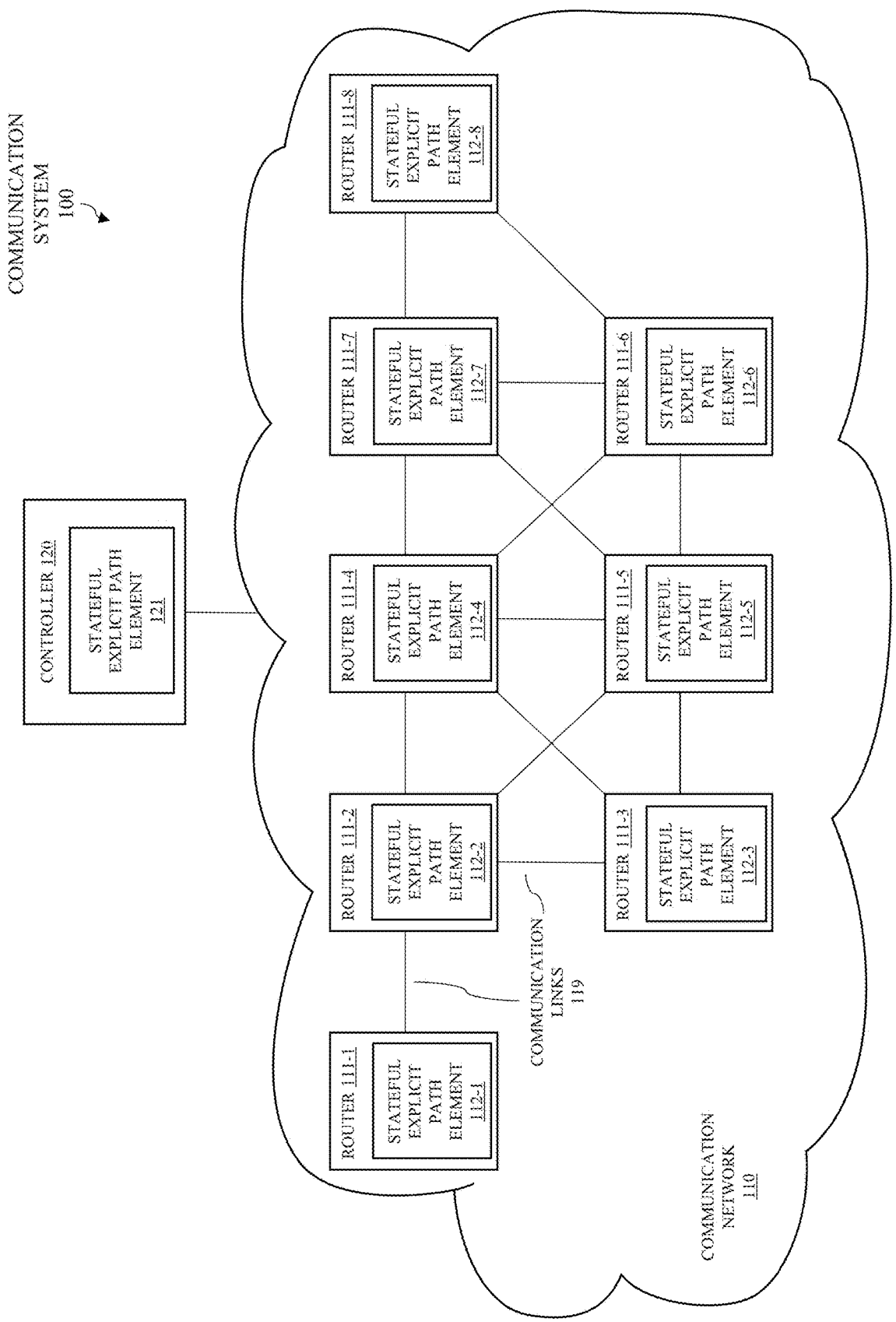
FIG. 1 depicts an example embodiment of a communication system configured to support communications based on stateful explicit paths.

FIG. 1 depicts an example embodiment of a communication system configured to support communications based on stateful explicit paths.

The communication system 100 includes a communication network 110 and a controller 120. The communication network 110 is a packet-switched network including a set of routers 111-1-111-8 (collectively, routers 111, which are also referred to herein using the notation Rx) and a set of communication links 119 via which the routers 111 are communicatively connected. The communication network 110 is configured to support various data plane and control plane functions for supporting communication of traffic using stateful explicit paths. The communication network 110 is configured to support communication of packets using stateful explicit paths. The routers 111 are configured to support routing of packets using stateful explicit paths. The routers 111-1-111-8 include stateful explicit path elements 112-1-112-8 (collectively, stateful explicit path elements 112), respectively, which are configured to support routing of packets using stateful explicit paths. The controller 120 is configured to provide various control functions for the communication network 110 (e.g., maintaining network topology and traffic engineering information, computing explicit paths for the communication network 110, or the like, as well as various combinations thereof) including control functions configured to support routing of packets by routers 111 of communication network 110 based on stateful explicit paths. The controller 120 includes a stateful explicit path element 121 configured to support routing of packets, based on stateful explicit paths, by routers 111 of communication network 110. Various example embodiments for supporting routing of packets within the communication network 110 based on stateful explicit paths may be further understood by first considering various aspects of packet switched networks configured to support routing of packets in communication networks.

It will be appreciated these, as well as various other aspects of example embodiments for supporting stateful explicit paths in IP networks, may be further understood by first considering various aspects of routing methodologies in IP networks.

IP networks are built on mesh topologies in which multiple paths to a destination exist. The links in the mesh are point-to-point links joined by nodes. A path to a destination may go through any number of nodes, and the path may change at any time due to traffic problems or failed links. In this environment, there are two possible packet routing methods: hop-by-hop destination-based routing or source routing.

Hop-by-hop destination-based routing is like getting directions along the way. An IP packet has a destination address in the IP header. Each node looks at the destination address and makes a routing decision about how to forward the packet. Thus, decisions are made on a hop-by-hop basis in the network until the packet reaches its destination. One example of hop-by-hop routing is shortest path routing. Interior Gateway Protocols (IGPs)—such as Intermediate-System-to-Intermediate-System (IS-IS), Open Shortest Path First (OSPF), OSPFv3, or the like—flood the status of links as Link State Advertisements (LSA) among all nodes in the network. From the flooded LSAs, each node builds an identical topology database of the network, which is known as Link State Database (LSDB). Then, by running Dijkstra's shortest path first (SPF) algorithm on the LSDB, every node computes a shortest path to every known destination. When a node receives a packet then it forwards the packet to the next-hop node in the shortest path to the destination.

Source Routing, also called stateless explicit path routing, allows a node A to partially or completely specify the path a packet takes to node B into the packet itself. Node A discovers an explicit path for a packet flow through the network in advance of sending packets. The explicit path is "encoded" into the packet as an ordered list of IP addresses (of nodes or next-hops in the path) in an IP header. Transit nodes forward the IP packet based on that path. Source Routing minimizes the states required in transit nodes to forward a packet, since each node only maintains forwarding information to one of its next-hops and is not required to maintain forwarding information to each possible packet destination. A generic method of source routing is presented with respect to FIG. 1.

In the example of FIG. 1, assume that the loopback IP address of node Rx is Rx, which is used as the node identifier. For example, the loopback IP address of node R7 is R7. Further, assume that the IP address assigned by node Ry on the link Rx-Ry is Rx→Ry. So, Rx→Ry is a next-hop identifier used by Rx to reach Ry on link Rx-Ry. For example, the IP address assigned by R4 on link R2-R4 is R2→R4. So, R2 will use IP address R2→R4 as a next-hop IP address on link R2-R4.

In FIG. 1, R1 (ingress node) decides to send a packet along the path R1-R2-R4-R7-R8. Assume that R1, R2, R3 . . . , R8 are loopback IP addresses assigned as node identifiers. So, R1 encodes the explicit path with node identifiers as {R2, R4, R7, R8} into the packet and sends the packet to R2. When R2 receives the packet, R2 pops the first hop in the explicit path, which is R2, since it identifies itself. Then R2 looks up the next hop in the explicit path, which is R4, in the routing table. R2 then forwards the packet to R4 with the explicit path in the packet as {R4, R7, R8}. When R4 receives the packet, R4 pops the first hop in the explicit path, which is R4, since it identifies itself. R4 looks up the next hop in the explicit path, which is R7, in the routing table. R4 forwards the packet to R7 with the explicit path {R7, R8}. When R7 receives the packet, R7 pops the first hop, which is R7, since it identifies itself. Then R7 looks up the next hop in the explicit path, which is R8, in the routing table. R7 forwards the packet to R8 with the explicit path {R8}. When R8 receives the packet, R8 pops the first hop, which is R8, since it identifies itself. Since the explicit path has become empty, it means the packet has traversed the source routed path till R8. R8 makes further forwarding decision on the packet based on the native header of the packet. As discussed further below, source routing may be performed using a loose source routing and/or a strict source routing.

In loose source routing, the head-end node can encode a set of nodes to be traversed and intermediate nodes along the path can choose among multiple paths to reach any nodes in the set of nodes. For example, in the example of the generic method of source routing described above, R2 may find the "optimal" path to R4 is via R2-R3-R4 instead of R2-R4. In this case, R2 will send explicit path {R3, R4, R7, R8} to R3. When R3 receives the packet and finds the first hop in the path as R3, it would pop R3 since it identifies itself. Then R3 looks up the next hop in the explicit path, which is R4, in its routing table and would send the packet with path {R4, R7, R8} to R4. So, when an explicit path contains one or more node identifier(s) then the path is called a loose source route since an intermediate node can choose one among the multiple paths to reach the a node, which is a loopback address in that node.

In strict source routing, the head-end node can encode a set of hops to be traversed and intermediate nodes along the path forward based on the specified hops. For example, in the example of the generic method of source routing described above, R1 encodes a set of next-hop identifiers such as {R2→R4, R4→R7, R7→R8} to specify the path to be taken by the packet. When R2 receives the packet, it pops R2→R4 from the packet and forwards the packet on R2→R4 link. When R4 receives the packet, it pops R4→R7 and forwards the packet on the R4→R7 link. When R7 receives the packet, it pops R7→R8 and forwards the packet on the R7→R8 link. In this manner, the exact path traversed by the packet is specified by the source node R1.

It will be appreciated, as indicated above, that a source node also may specify a mix of loose hops and strict hops. For example, in the example of the generic method of source routing described above, R1 can also specify a mix of strict and loose hops such as {R2→R4, R8}. It will be appreciated that strict source routing is preferable when a packet belonging to a service or application that needs to meet strict Quality of Service (QoS) or Service Level Agreement (SLA) and, thus, must follow a strict path. So, strict source routing is the default choice for source routing with traffic engineering (TE). A description of source routing with traffic engineering (SR-TE) follows.

In SR-TE, various TE parameters are assigned into the network elements (e.g., the nodes and links). The TE parameters of a network element describe the cost, delay, throughput, available bandwidth, packet loss characteristics etc. of the network element. The topology and TE parameters of all network elements are learned and are maintained in a centralized TE Database (TEDB) hosted by a controller (e.g. a Path Computation Element (PCE), a Software Defined Networking (SDN) controller, or the like). The controller can learn TE and topology information by listening to link-state advertisements (LSAs) from the Interior Gateway Protocol (IGP) running among the routers (e.g., Intermediate-System-to-Intermediate-System (ISIS), Open Shortest Path First (OSPF), or the like). The controller can also gather such information from the routers, e.g., using Border Gateway Protocol—Link State (BGP-LS) such as in RFC 7752, using a push/pull mechanism or the like, as well as various combinations thereof.

In SR-TE, the head-end node classifies packets into flows based on application or a service. Each flow is associated with specific QoS requirement or SLA. The head-end node sends a request to the controller (e.g., PCE, SDN controller, or the like) to compute an optimal/explicit path that meets the specified QoS/SLA. The controller typically computes such a path by running Constraint Shortest Path First (CSPF) techniques on the TE DB. Once a path is allocated, the controller updates the dynamic TE state (e.g. residual bandwidth) of the network elements along that path into the TEDB. The head-end node sends all packets belonging to a flow over the explicit path that meets the QoS/SLA of the flow. The explicit path is encoded into the packet. Thus, it is possible that packets of different flows to same destination follow diversified paths. The per-flow states are maintained only at the head-end node and transit nodes are completely agnostic of a flow, the QoS/SLA needs of the flow, and so forth. This results in a significant reduction of cost and complexity at transit nodes.

In recent years, Source Routing, which was typically used for Internet Protocol version 4 (IPv4), has been revamped as Segment Routing (SR) by extending source routing capabilities into Multiprotocol Label Switching (MPLS) and IP version 6 (IPv6). In SR, the loopback address of a router is referred to as a "Prefix Segment" and next-hop adjacency/link between two routers is referred to as an "Adjacency Segment". In SR, each segment is assigned a Segment Identifier (SID), which is encoded into an explicit path to identify the segment. SR using an IPv6 dataplane is described in RFC 8754. There is no explicit specification for SR using an IPv4 dataplane, since SR uses the IPv4 source routing described in the base IPv4 specification RFC 791.

Various example embodiments may be configured to support stateful explicit paths in IP networks. An explicit path is created from node A to node B in an IP network. The path is uniquely identified across the network by the tuple {Ingress_IP_addr=IP address of node A, Egress_IP_addr=IP address of node B, Path-ID=a unique identifier assigned to the path by node A}. This tuple is referred to as "IP-Tunnel-ID" where it is noted that the keyword "Tunnel" is used since the path provides a form of tunnel from node A to node B for transporting any type of packets over the path (and it will be appreciated that, in various example embodiments, the term "Tunnel" also may be referred to as a "Stateful IP Tunnel"). The states for the path are configured in each node along the path using the IP-Tunnel-ID as its identifier such that, in each node of the path, the IP-Tunnel-ID maps to the next-hop in the path for the node, respectively.

Various example embodiments may be configured to support stateful explicit paths in IP networks. An explicit path is created from node A to node B in an IP network such that the state of the path is maintained across all nodes along the path. The path is uniquely identified by the tuple {Ingress_IP_addr=IP address of node A, Egress_IP_address=IP address of node B, Path-ID=an identifier unique to node A}, which is referred to herein as "IP-Tunnel-ID". IP-Tunnel-ID is also the identification of its state installed in the nodes along the path. There could be more than one stateful explicit path from node A to node B, each traversing a different set of nodes and differentiated by its unique Path-ID. A packet sent from node A over an explicit path is encapsulated in an IP header where the IP header encodes the IP-Tunnel-ID. The source address (SA) of the IP header encodes the Ingress_IP_addr, the destination address (DA) of the IP header encodes the Egress_IP_addr and Path-ID is encoded as an extension to IP header. The resultant IP packet gets forwarded along the path, with each node in the path looking up the state for IP-Tunnel-ID for the forwarding decision, until node B wherein the IP header is removed to retrieve and process the original packet. One primary application of stateful explicit paths in IP networks is support stateful traffic engineering (TE) in IP networks.

Node A sends a packet over the path by encapsulating the packet with an IP Header, where the SA in the IP header is the IP address of node A (i.e., Ingress_IP_addr), DA in the IP header is the IP address of node B (i.e., Egress_IP_addr) and Path-ID is included as an extension to the IP Header. Node A sends the IP packet to the next-hop of the IP-Tunnel-ID. When a node receives an IP packet that includes a Path-ID, it looks up the state for the IP-Tunnel-ID={SA=SA in IP header, DA=DA in IP header, Path-ID=Path-ID extension in IP header} and forwards the packet to the next-hop of the IP-Tunnel-ID. In this way, the IP packet traverses the explicit path and eventually reaches the egress node of the path (DA in IP header). The egress node pops the IP header and performs further forwarding action based on the native headers of the data packet.

It will be appreciated that there can be multiple explicit paths from node A to node B. In that case, each path is distinguished by the Path-ID since the Ingress_IP_addr and Egress_IP_addr in their IP-Tunnel-IDs are the same. It is also possible to have multiple explicit paths from node A to node B that traverse exactly the same set of hops.

It will be appreciated that the Path-ID assigned to a path may be assigned in various ways. For example, the Path-ID assigned to a path may be unique to the ingress node or unique across the IP network. For example, the Path-ID assigned to the path may be assigned by the ingress node, a central controller (e.g., a Path Computation Element (PCE) or other suitable controller), or the like. For example, if the path-ID space is unique to the ingress node then this is a sufficient condition to ensure uniqueness of the tuple across the network; however, it is also possible that a centralized controller (e.g., a PCE or the like) allocates the path-ID (which may be network wide unique or may be unique to the ingress node of the associated path) during path computation, which may then be provided to the ingress node (e.g., along with the computed path) for use in sending packets over the path. It will be appreciated that the Path-ID assigned to a path may be assigned in various other ways.

The states of the path can be configured in every node along the path in various ways (e.g., using a control plane protocol running among the nodes, statically configuring the path state in every node along the path using a central controller, or the like, as well as various combinations thereof.

The states of the path can be configured in every node along the path by using a control plane protocol running among the nodes in the network. Ingress node A originates a path set-up message in a control protocol using the tuple {IP-Tunnel-ID, list_of_hops[ ]}, wherein list_of_hops[ ] is an ordered list of network elements (nodes or next-hops) along the path. The path-setup message is sent to the next-hop along the path. When a node receives a path set-up message, it looks up the subsequent next-hop in the list_of_hops[ ] and installs the state for the IP-Tunnel-ID that maps to that next-hop. The node forwards the path-setup message to the next-hop. In this way, the path setup message traverses each node in the path by installing state for the IP-Tunnel-ID. Eventually, the path set-up message reaches the egress node (i.e., the last hop in list_of_hops[ ], which is node B) and then the egress node sends a path acknowledgment (path ACK) to the upstream node (the neighbor node that sent the path set-up message) confirming that the path set-up is complete. A node that receives a path ACK message forwards the message to the upstream node of the path, and eventually the path ACK is received by the ingress node (node A). That marks the successful completion of setting up the path and now node A can start sending packets along the path. Node A can tear down the path by sending a path tear-down message that includes the IP-Tunnel-ID. A node that receives the path tear-down message deletes the state for IP-Tunnel-ID and then forwards the message to the next-hop that was mapped to the path. The path tear-down eventually reaches the egress node, tearing down the states of IP-Tunnel-ID along its path. It will be appreciated that various control plane protocols may be used to support setup of such explicit paths in IP networks (e.g., Interior Gateway Protocols (IGPs), such as Intermediate-System-to-Intermediate-System (IS-IS), Open Shortest Path First (OSPF), OSPFv3, or the like).

The states of the path can be configured in every node along the path by statically configuring the path state in every node along the path using a central controller (e.g., a centralized network controller, an SDN controller, or the like).

Figure 2:
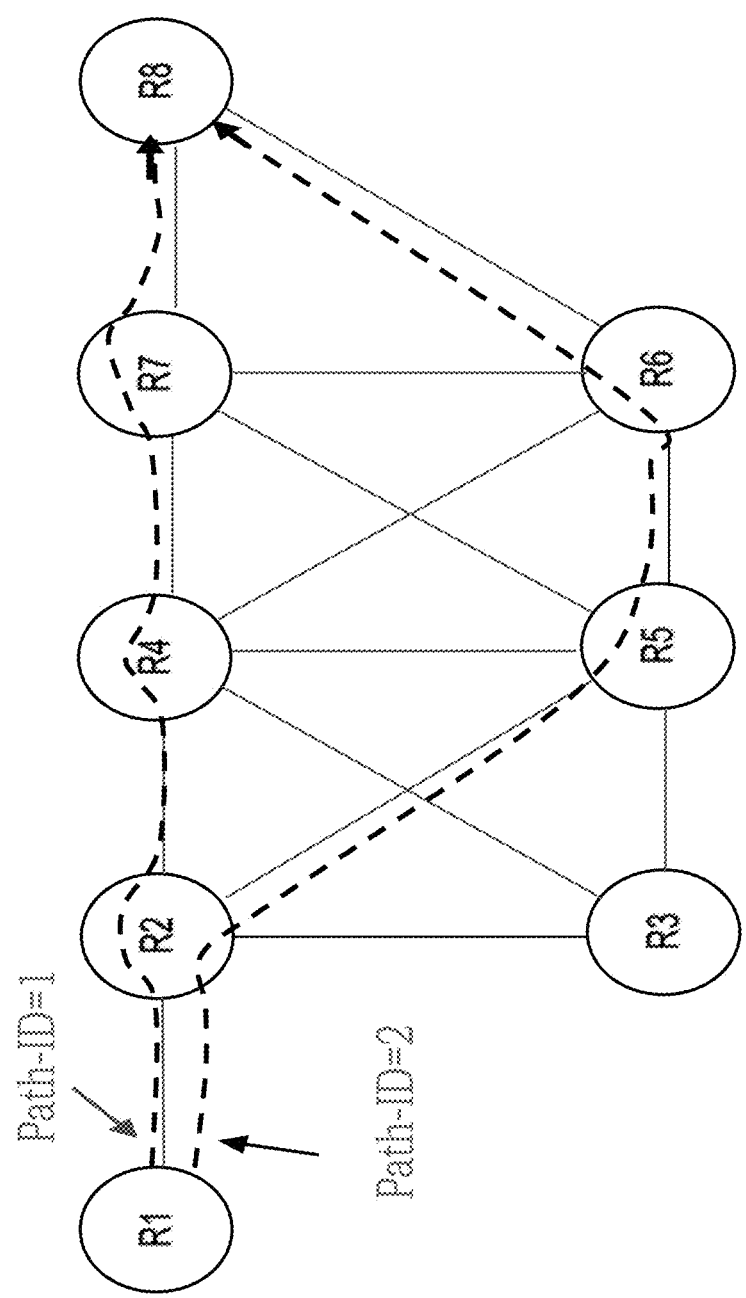
FIG. 2 depicts an example embodiment of stateful explicit paths within the context of the communication network of FIG. 1.

It will be appreciated that the concept of stateful explicit paths in IP networks may be further understood by way of reference to FIG. 2.

FIG. 2 depicts an example embodiment of stateful explicit paths within the context of the communication network of FIG. 1.

In FIG. 2, communication network 200 is similar to the communication network 110 of FIG. 1. The communication network 200 includes the same routers as in the communication network 110 of FIG. 1.

In FIG. 2, two stateful explicit paths are set-up from R1 (ingress) to R8 (egress) as follows.

The path that traverses the hops {R1→R2, R2→R4, R4→R7, R7→R8} is assigned Path-ID 1. So, its IP-Tunnel-ID is {SA=R1, DA=R8, Path-ID=1}. For simplicity of reference, this IP-Tunnel-ID is denoted as IP-Tunnel-ID-1.

The path that traverses the hops {R1→R2, R2→R5, R5→R6, R6→R8} is assigned Path-ID 2. So, it's IP-Tunnel-ID is {SA=R1, DA=R8, Path-ID=2}. For simplicity of reference, this IP-Tunnel-ID is denoted as IP-Tunnel-ID-2.

The states for IP-Tunnel-ID-1 are configured in the nodes as follows: (1) R1=>IP-Tunnel-ID-1, next-hop=R1→R2, (2) R2=>IP-Tunnel-ID-1, next-hop=R2→R4, (3) R4=>IP-Tunnel-ID-1, next-hop=R4→R7, (4) R7=>IP-Tunnel-ID-1, next-hop=R7→R8, (5) R8=>IP-Tunnel-ID-1, next-hop=self.

Now, R1 sends a packet P over the path/tunnel by encapsulating the packet in an IP Header={SA=R1, DA=R8, Path-ID extension=1}. R1 sends the resultant IP packet {IP Header={SA=R1, DA=R8, Path-ID extension=1}, P} to next-hop R1→R2.

When R2 receives the IP packet with the Path-ID extension, R2 extracts the IP-Tunnel-ID from the IP header, which is IP-Tunnel-ID-1. R2 looks up the state of IP-Tunnel-ID-1, which maps to next-hop R2→R4. So, R2 forwards the IP packet to R2→R4.

When R4 receives the IP packet with the Path-ID extension, R4 extracts the IP-Tunnel-ID from the IP header, which is IP-Tunnel-ID-1. R4 looks up the state of IP-Tunnel-ID-1, which maps to next-hop R4→R7. So, R4 forwards the IP packet to R4→R7.

When R7 receives the IP packet with Path-ID extension, R7 extracts the IP-Tunnel-ID from the IP header, which is IP-Tunnel-ID-1. R7 looks up the state of IP-Tunnel-ID-1, which maps to next-hop R7→R8. So, R7 forwards the IP packet to R7→R8.

When R8 receives the IP packet with Path-ID extension, R8 extracts the IP-Tunnel-ID from the IP header, which is IP-Tunnel-ID-1. R8 looks up the state of IP-Tunnel-ID-1, which maps to next-hop as itself, meaning that it is the egress node. So, R8 pops the IP header and processes the packet based on its native header.

Figure 3:
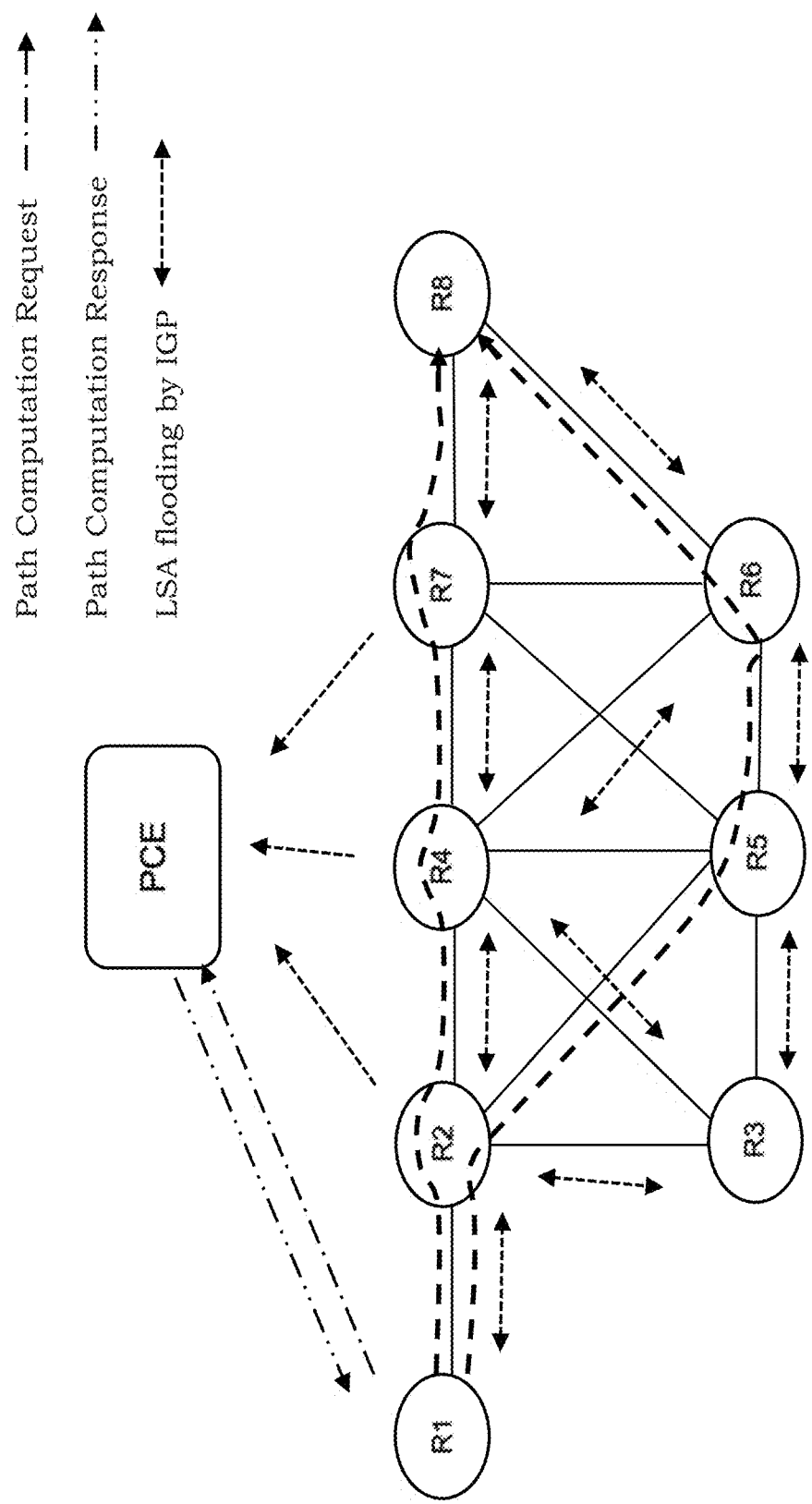
FIG. 3 depicts an example embodiment of a communication system configured to support communications based on Traffic Engineered (TE) stateful explicit paths.

The states of the explicit paths in FIG. 2 can be set up by a control protocol, which is explained in the context of stateful TE in FIG. 3.

One application of a stateful explicit path in IP networks is stateful traffic engineering (TE) in IP networks. Stateful TE generally does not exist today in IP networks. In this context, an explicit path is set-up with a specified QoS guarantee. It works with the following principles. Various TE parameters are assigned into the network elements (e.g., nodes and links). TE parameters of a network element describe various characteristics of the network element (e.g., cost, delay, throughput, available bandwidth, packet loss, or the like, as well as various combinations thereof). The topology and TE parameters of all network elements are flooded across the network by the Interior Gateway Protocols (IGPs) running among the nodes. In this way, every node builds an identical TE Database (TEDB) of the network. Optionally, the TE parameters can be also flooded to a centralized controller of the network (e.g., a Path Computation Element (PCE), a Software Defined Networking (SDN) controller, or the like). The ingress node classifies packets into flows based on an application or a service. Each flow is associated with specific Quality of Service (QoS) requirement or Service Level Agreement (SLA). The ingress node computes an optimal/explicit path that meets the specified QoS by running Constraint Shortest Path First (CSPF) techniques on its TEDB. Alternately, if a centralized controller is deployed in the network, then the ingress node can send a path computation request to the controller and the controller returns the computed path after running CSPF on its TEDB. Once a path is computed, the ingress node sends a path-setup message (using a control protocol) that also includes the TE resources to be reserved along the path (termed as TE_Spec which is translated from QoS). So the path message is sent with {IP-Tunnel-ID, list_of_hops[ ], TE_Spec}. A node that sets up the state for the path after receiving the path-setup message, makes reservation of the TE resources on the next-hop based on TE_Spec. The node updates the dynamic TE state (e.g. residual bandwidth) of the next-hop in its TEDB. The update is also flooded by the IGPs to reflect the change across the TEDBs in all nodes. After the TE explicit path is successfully set up, the ingress node sends all packets belonging to an associated flow over the explicit path. Thus, it is possible that packets of different flows to the same destination follow diversified TE explicit paths based on the QoS of the flows. It is noted that, for simplicity, various example embodiments presented herein are primarily described with respect to use of a single QoS parameter (namely, bandwidth (BW)); however, it will be appreciated that the various example embodiments presented herein may be configured to support various other QoS parameters or combinations of QoS parameters for supporting TE-based stateful explicit paths in IP networks. TE-based stateful explicit paths may be further understood by way of reference to FIG. 3.

FIG. 3 depicts an example embodiment of a communication system configured to support communications based on Traffic Engineered (TE) stateful explicit paths.

In FIG. 3, communication system 300 is similar to the communication system 100 of FIG. 1. The communication system 300 includes the same routers as in FIG. 1, and includes a PCE configured to operate as the controller of FIG. 1.

In FIG. 3, for example, assume that each link is configured with BW of 10 Gbps, which translates into two TE parameters—maximum BW and residual BW. Maximum BW is the configured BW of 10 Gbps and residual BW is (maximum BW—total reserved BW). So, residual BW changes as per reservations made on the link. Initially, when no paths are configured across the network, the residual BW on each link is 10 Gbps. Each of the nodes R1-R8 floods the TE parameters of locally connected links using an IGP running among the nodes. As a result, each node builds an identical TEDB containing the TE parameters of each network element in the network. Optionally, the network may employ a centralized controller (e.g., a PCE, SDN controller, or the like) which also may participate in the IGP to build the TEDB.

In FIG. 3, assume that a packet flow from R1 to R8 requires a QoS of BW 2 Gbps. R1 computes an explicit path to R8 by running CSPF in its TEDB where the given QoS constraint is BW 2 Gbps. Further assume that the computed path is {R1→R2, R2→R4, R4→R7, R7→R8}, which meets the QoS of BW 2 Gbps since each link on the path has residual BW of 10 Gbps. R1 assigns Path-ID 1 to the path. So, the IP-Tunnel-ID is {SA=R1, DA=R8, Path-ID=1} which is denoted as IP-Tunnel-ID-1.

R1 sets up the states of the path using a control protocol. R1 originates a path-setup message of the control protocol, where the message carries at least the tuple {IP-Tunnel- ID=IP-Tunnel-ID-1, list_of_hops[ ]={R1→R2, R2→R4, R4→R7, R7→R8, pointer=R1→R2}, TE_Spec=2 Gbps}. It is noted that list_of_hops[ ] also includes a 'pointer' variable that points to the next-hop for the next-hop node. So, in the list_of_hops[ ], R1 sets the pointer to R2→R4 and replaces its previous hop R1→R2 with R2→R1 to record the latest upstream hop of the message. R1 sends the path-setup message {IP-Tunnel-ID=IP-Tunnel-ID-1, list_of_hops[ ]={R2→R1, R2→R4, R4→R7, R7→R8, pointer=R2→R4}, TE_Spec=2 Gbps} to the first hop R1→R2.

When R2 receives the path-setup message, R2 first looks up the pointer in list_of_hops[ ], and finds the next-hop of the path as R2→R4. Then, R2 looks up TE_Spec and checks if the requested TE resources can be reserved on R2→R4. In this case, the TE-resources to reserve is 2 Gbps and residual BW on R2→R4 is 10 Gbps. So, R2 makes a reservation of 2 Gbps on R2→R4 after which residual BW on R2→R4 becomes 8 Gbps. The change on the residual BW on R2→R4 is flooded across the network by the IGP, so the TEDB in each node is updated about the change in residual BW on R2→R4. Then, R2 creates a state for IP-Tunnel-ID-1 that maps to next-hop R2→R4. R2 will also mark the previous hop R2→R1 in list_of_hops[ ] as upstream since the control protocol messages for the path need to be exchanged with upstream. In the path-setup message, R2 updates the pointer in list_of_hops[ ] to the next entry, i.e., R4→R7 and replaces previous hop R2→R4 with R4→R2 to record the latest upstream hop of the message. R2 forwards the path-setup message {IP-Tunnel-ID=IP-Tunnel-ID-1, list_of_hops[ ]={R2→R1, R4→R2, R4→R7, R7→R8, pointer=R4→R7}, TE_Spec=2 Gbps} to R2→R4.

When R4 receives the path-setup message, R4 first looks up the pointer in list_of_hops[ ], and finds the next-hop of the path as R4→R7. Then, R4 looks up TE_Spec and checks if requested TE resources can be reserved on R4→R7. In this case, the TE-resources to reserve is 2 Gbps and residual BW on R4→R7 is 10 Gbps. So, R4 makes a reservation of 2 Gbps on R4→R7 after which residual BW on R4→R7 becomes 8 Gbps. The change on the residual BW on R4→R7 is flooded across the network by the IGP, so the TEDB in each node is updated about the change in residual BW on R4→R7. Then, R4 creates a state for IP-Tunnel-ID-1 that maps to next-hop R4→R7. R4 will also mark the previous hop R4→R2 in list_of_hops[ ] as upstream since the control protocol messages for the path need to be exchanged with upstream. In the path-setup message, R4 updates the pointer in list_of_hops[ ] to the next entry, i.e., R7→R8 and replaces previous hop R4→R7 with R7→R4 to record the latest upstream hop of the message. R4 forwards the path-setup message {IP-Tunnel-ID=IP-Tunnel-ID-1, list_of_hops[ ]={R2→R1, R4→R2, R7→R4, R7→R8, pointer=R7→R8}, TE_Spec=2 Gbps} to R4→R7.

When R7 receives the path-setup message, R7 first looks up the pointer in list_of_hops[ ], and finds the next-hop of the path as R7→R8. Then, R7 looks up TE_Spec and checks if requested TE resources can be reserved on R7→R8. In this case, the TE-resources to reserve is 2 Gbps and residual BW on R7→R8 is 10 Gbps. So, R7 makes a reservation of 2 Gbps on R7→R8 after which residual BW on R7→R8 becomes 8 Gbps. The change on the residual BW on R7→R8 is flooded across the network by the IGP, so the TEDB in each node is updated about the change in residual BW on R7→R8. Then, R7 creates a state for IP-Tunnel-ID-1 that maps to next-hop R7→R8. R7 will also mark the previous hop R7→R4 in list_of_hops[ ] as upstream since the control protocol messages for the path need to be exchanged with upstream. In the path-setup message, R7 updates the pointer in list_of_hops[ ] as 'none' since no more hops to traverse after this next-hop, and replaces previous hop R7→R8 with R8→R7 to record the latest upstream hop of the message. R7 forwards the path-setup message {IP-Tunnel-ID=IP-Tunnel-ID-1, list_of_hops[ ]={R2→R1, R4→R2, R7→R4, R8→R7, pointer=none}, TE_Spec=2 Gbps} to R7→R8.

When R8 receives the path-setup message, R8 first looks up the pointer in list_of_hops[ ], and finds the next-hop as 'none'. So, R8 determines that it is the egress router for the path. R8 creates a state for IP-Tunnel-ID-1 that maps to next-hop as 'self' (or egress). R8 will also mark the previous hop R8→R7 in list_of_hops[ ] as upstream since the control protocol messages for the path need to be exchanged with upstream. It is noted that the list_of_hops[ ] in the path-setup message now includes the record of all hops traversed by the message.

R8 originates a path ACK message including at least {IP-Tunnel-ID=IP-Tunnel-ID-1} and sends the message to upstream R8→R7. When R7 receives the path ACK message, R7 marks the downstream path of IP-Tunnel-ID-1 as complete and sends the message to its upstream for IP-Tunnel-ID-1, i.e., R7→R4. Eventually, the path ACK message is received by R1, which marks the successful set-up of the stateful explicit path for IP-Tunnel-ID-1. Now, R1 can start sending packets on IP-Tunnel-ID-1. The packet forwarding procedures in the data plane is same as illustrated for IP-Tunnel-ID-1 in FIG. 2.

It is noted that, if a node is unable to create the state for an IP-Tunnel-ID after receipt of path setup message, the node will send a path error message to the upstream. A node that receives a path error message for an IP-Tunnel-ID from its next-hop would delete the state from the IP-Tunnel-ID and would propagate the path error message to the upstream node.

Figure 4:
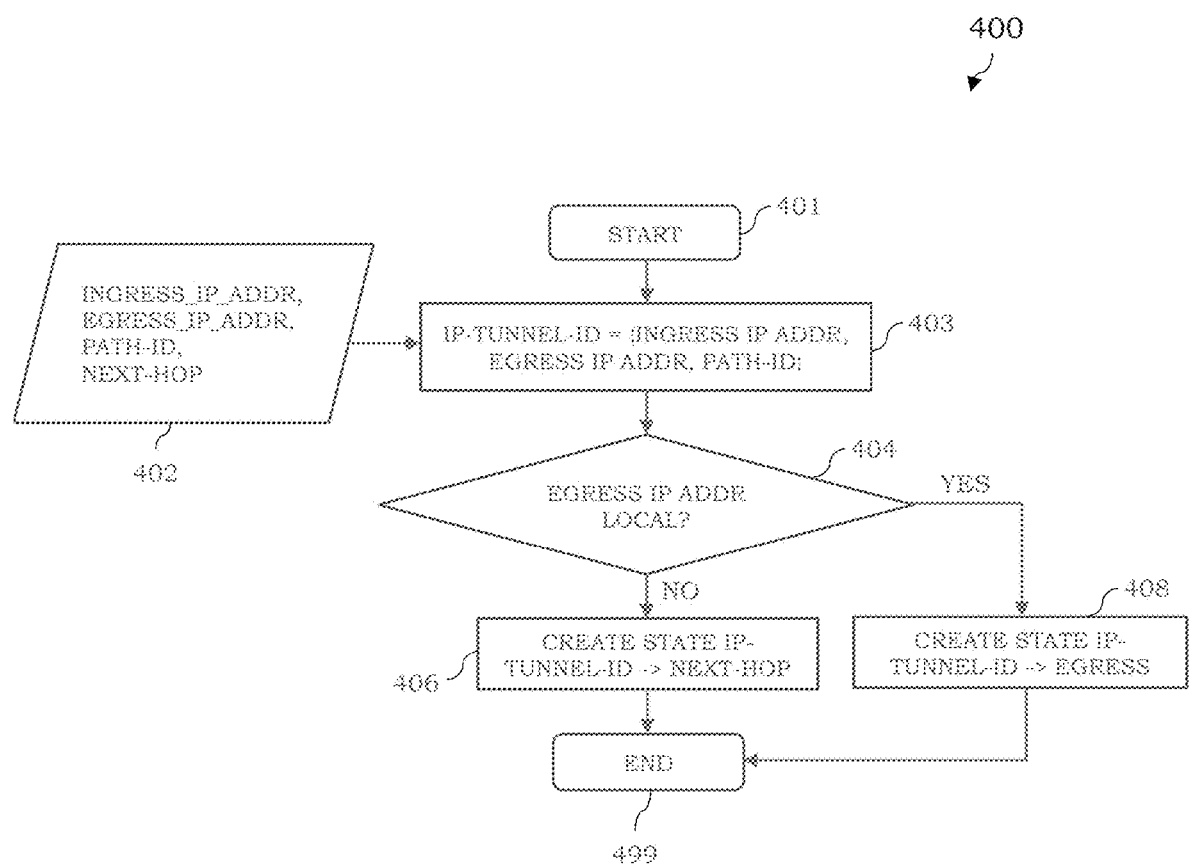
FIG. 4 depicts an example embodiment of a method for configuration of a stateful explicit path in a node in an IP network.

FIG. 4 depicts an example embodiment of a method for configuration of a stateful explicit path in a node in an IP network. At block 401, the method 400 begins. The inputs 402 to method 400 include (1) Ingress_IP_addr (i.e., IP address of the ingress node of the path), (2) Egress_IP_addr (i.e., IP address of the egress node of the path), (3) Path-ID assigned to the path, and (4) Next-Hop of the path from this node. Block 403 builds the IP-Tunnel-ID as the tuple {ingress=Ingress_IP_addr, egress=Egress_IP_addr, Path-ID}, and the method 400 proceeds to block 404. Block 404 checks if the Egress_IP_addr is local to the node. If the Egress_IP_addr is local to the node then the method 400 proceeds to block 408; otherwise, the method 400 proceeds to block 406. Block 406 creates the state of the IP-Tunnel-ID that maps to the input Next-Hop, and the method 400 then proceeds to block 499 where the method 400 ends. Block 408 creates the state of the IP-Tunnel-ID that maps as the egress for the path, and the method 400 then proceeds to block 499 where the method 400 ends. At block 499, the method 400 ends.

Various example embodiments may be configured to support use of control plane methods for supporting configuration of a stateful explicit path across an IP network. The control protocols may include Resource Reservation Protocol—Traffic Engineering (RSVP-TE), Constraint-Based Routing—Label Distribution Protocol (CR-LDP), Interior Gateway Protocols (IGPs) (e.g., Intermediate-System-to-Intermediate System (IS-IS), Open Shortest Path First (OSPF), or the like), or the like, as well as various combinations thereof.

Figure 5:
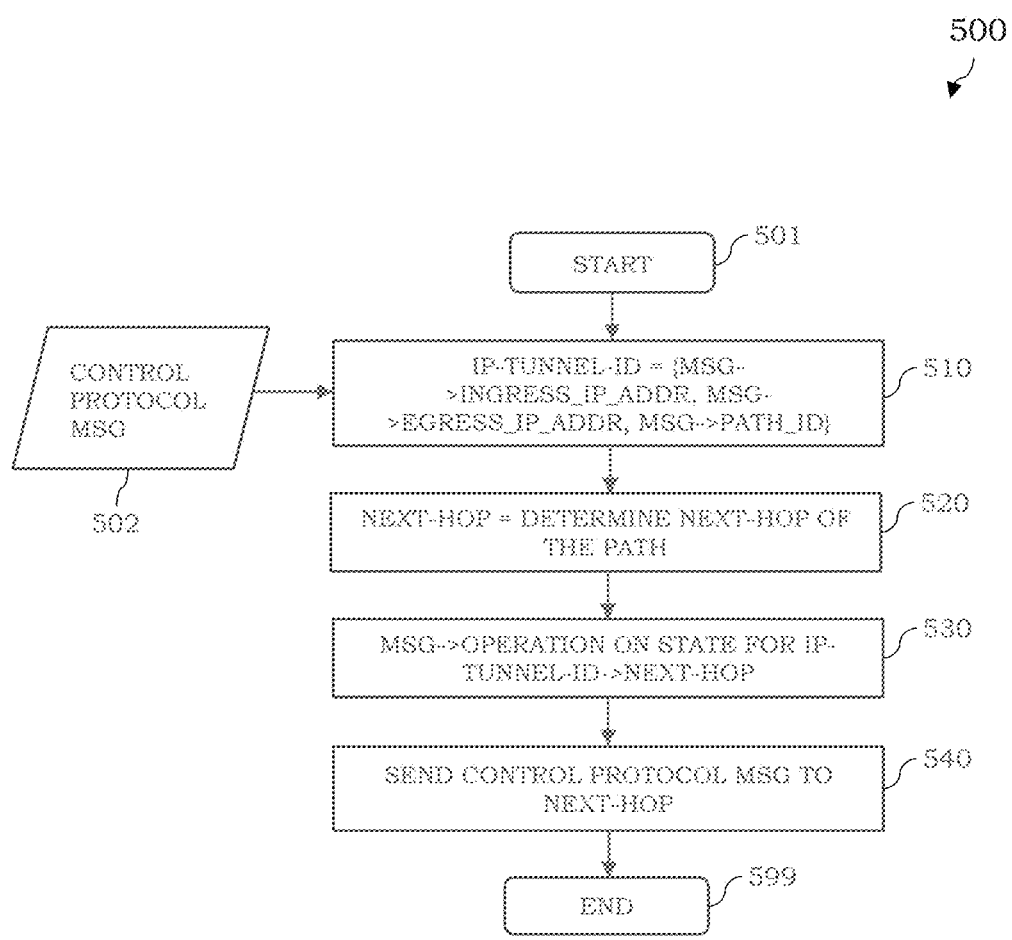
FIG. 5 depicts an example embodiment of a method for use by a control protocol in a node for configuration of state of a stateful explicit path in an IP network.

FIG. 5 depicts an example embodiment of a method for use by a control protocol in a node for configuration of state of a stateful explicit path in an IP network. At block 501, the method 500 begins. The input 502 to method 500 is a message in the control protocol for configuration of an explicit path. Block 510 builds the IP-Tunnel-ID from the Ingress_IP_addr, Egress_IP_addr, and Path-ID encoded in the message, and the method 500 then proceeds to block 520. Block 520 determines the next-hop for the IP-Tunnel-ID. It is noted that the determination of the next-hop can be made from the list_of_hops[ ] encoded in the message. From block 520 the method 500 proceeds to block 530. Block 530 performs the required operation (specified in the message) on the state of the IP-Tunnel-ID, such as creation, modification, or deletion of state. From block 530, the method 500 proceeds to block 540. Block 540 forwards the message to the next-hop. At block 599, the method 500 ends.

Figure 6:
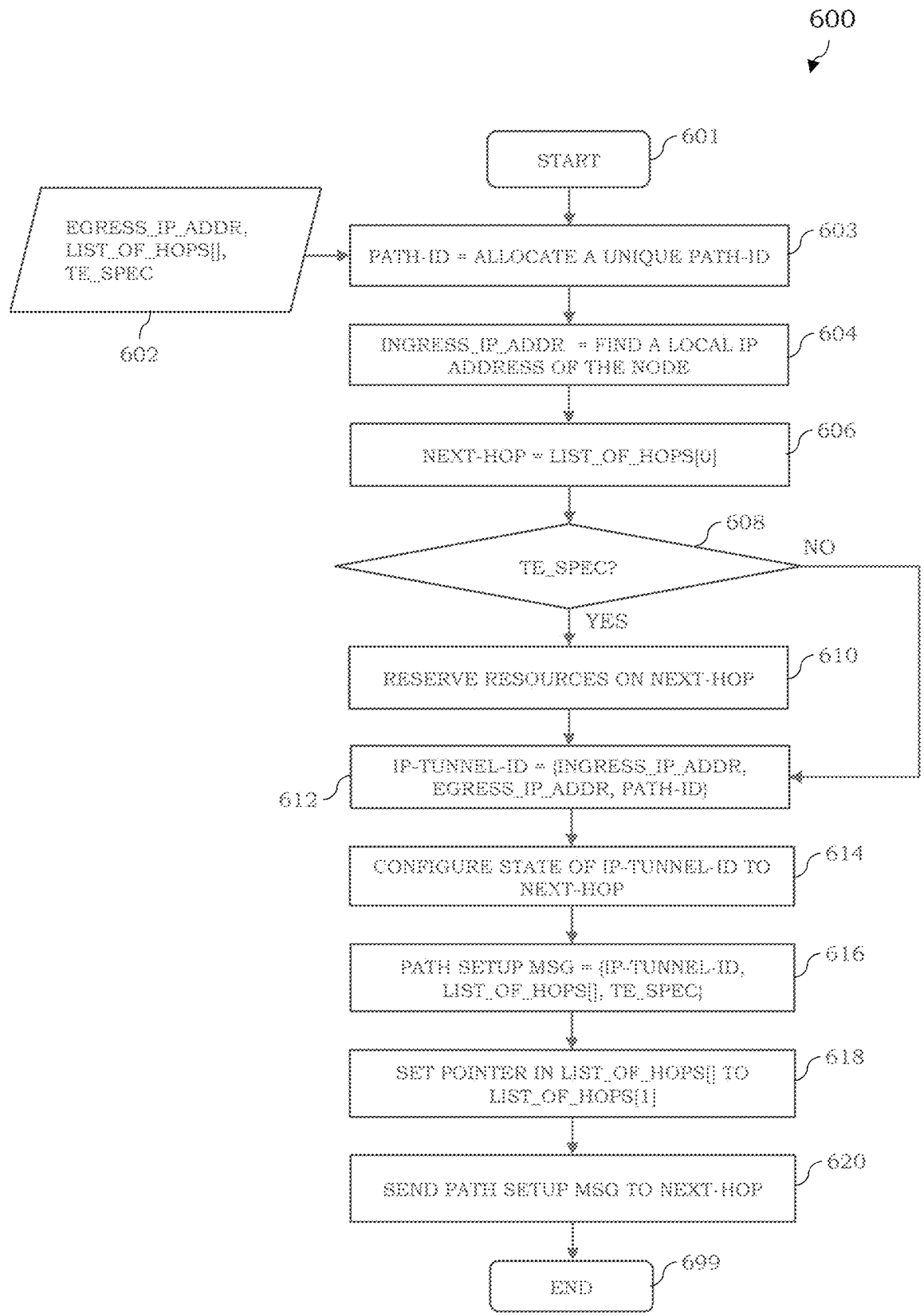
FIG. 6 depicts an example embodiment of a method for use by a control protocol in an ingress node for initiating configuration of a stateful explicit path.

FIG. 6 depicts an example embodiment of a method for use by a control protocol in an ingress node for initiating configuration of a stateful explicit path. The method 600 is based on the generic framework presented in FIG. 5. At block 601, the method 600 begins. The inputs 602 to the method 600 include (1) Egress_IP_addr, the IP address of the egress node of the path, (2) List_of_hops[ ], an ordered list of hops in the path, and (3) TE_Spec, the TE resources to be reserved from the flow (which is only applicable if setting up a TE path). Block 603 allocates a unique Path-ID to identify the path in this node, and the method 600 then proceeds to block 604. Block 604 finds a local IP address in the node to be used as the IP address of the ingress node, and the method 600 proceeds to block 606. Block 606 picks up the first hop in List_of_hops[ ] as the next-hop for this node, and the method 600 then proceeds to block 608. Block 608 checks if TE_Spec is provided as input. If the TE_Spec is provided as input then the method 600 proceeds to block 610; otherwise, the method 600 proceeds to block 612. Block 610 reserves the TE resources on the next-hop, and the method 600 then proceeds to block 612. Block 612 creates the IP-Tunnel-ID from the IP addresses of the ingress and egress nodes and the Path-ID, and the method 600 then proceeds to block 614. Block 614 configures the state of the IP-Tunnel-ID to the next-hop. This block may be implemented by the method 400 of FIG. 4. From block 614, the method 600 proceeds to block 616. Block 616 creates the path set-up message that includes IP-Tunnel-ID, List_of_hops[ ], and TE_Spec, and the method 600 then proceeds to block 618. Block 618 sets the pointer on the List_of_hops[ ] in the path set-up message to the second hop, and the method 600 then proceeds to block 620. Block 620 sends the path setup message to the next-hop, and the method 600 then proceeds to block 699 where the method 600 ends. At block 699, the method 600 ends.

Figure 7:
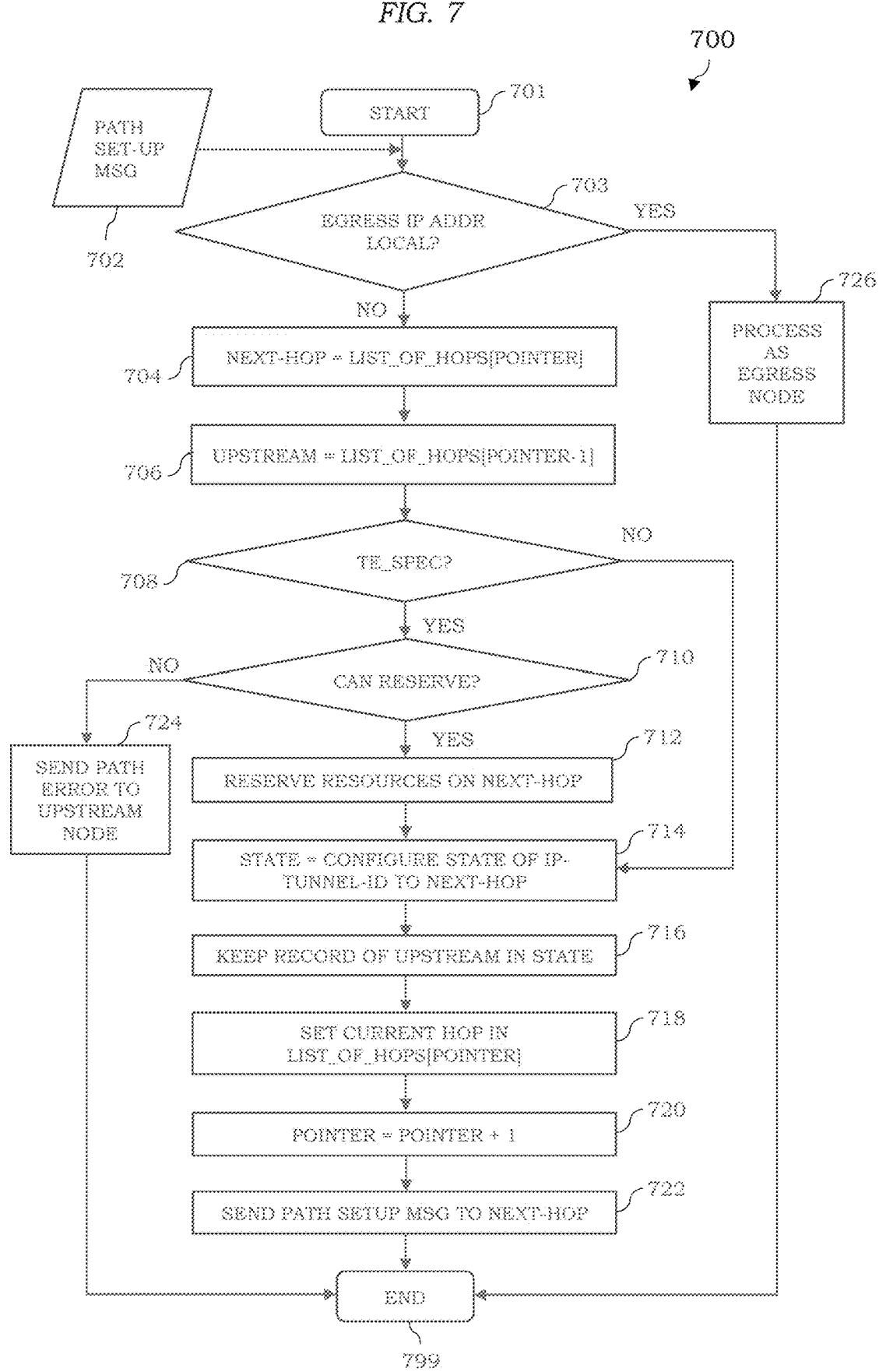
FIG. 7 depicts an example embodiment of a method for use by a control protocol in a transit node or an egress node for supporting configuration of a stateful explicit path.

FIG. 7 depicts an example embodiment of a method for use by a control protocol in a transit node or an egress node for supporting configuration of a stateful explicit path. The method 700 is based on the generic framework presented in FIG. 5. At block 701, the method 700 begins. The input 702 to the method 700 is a path set-up message received from a neighboring node. Block 703 checks if the Egress_IP_addr in the IP-Tunnel-ID encoded in the path set-up message is a local address. If the Egress_IP_addr in the IP-Tunnel-ID encoded in the path set-up message is a local address, then the method 700 proceeds to block 726; otherwise, the method 700 proceeds to block 704. Block 726 processes the path set-up message as the egress node for the path. It is noted that the block 726 may be implemented by the method of FIG. 8. From block 726, the method 700 proceeds to block 799, where the method 700 ends. Block 704 finds the next-hop in the path based on the pointer to List_of_hops[ ] (i.e., hop List_of_hops[pointer] in the message), and the method 700 then proceeds to block 706. Block 706 finds the upstream node of the path setup message, which is List_of_hops[pointer−1], and the method 700 then proceeds to block 708. Block 708 checks if TE_Spec (resources to be reserved) is included in the path set-up message. If TE_Spec is included in the path set-up message then the method 700 proceeds to block 710, otherwise the method 700 proceeds to block 714. Block 710 checks if the next-hop has adequate resources for the reservation. If the reservation cannot be made then the method 700 proceeds to block 724; otherwise, the method 700 proceeds to block 712. Block 724 sends a path error to the upstream node indicating the failure to set up the path, and the method 700 then proceeds to block 799 where the method 700 ends. Block 712 reserves the required resources on the next-hop, and the method 700 then proceeds to block 714. Block 714 creates the state of the Tunnel-ID and its mapping to the next-hop. It is noted that this block may be implemented by the method 400 of FIG. 4. From block 714, the method 700 proceeds to block 716. Block 716 marks the upstream node with the state of the Tunnel-ID so that control protocol messages can be sent to the upstream, as needed. From block 716, the method 700 proceeds to block 718. Block 718 sets the identifier of the hop in this node into the List_of_hops[ ] (i.e., hop in List_of_hops[pointer]) to record that this hop has been traversed by the message, and the method 700 then proceeds to block 720. Block 720 increments the pointer to the List_of_hops[ ] by one, and the method 700 then proceeds to block 722. Block 722 sends the path set-up message to the next-hop. From block 722, the method 700 proceeds to block 799 where the method 700 ends. At block 799, the method 700 ends.

Figure 8:
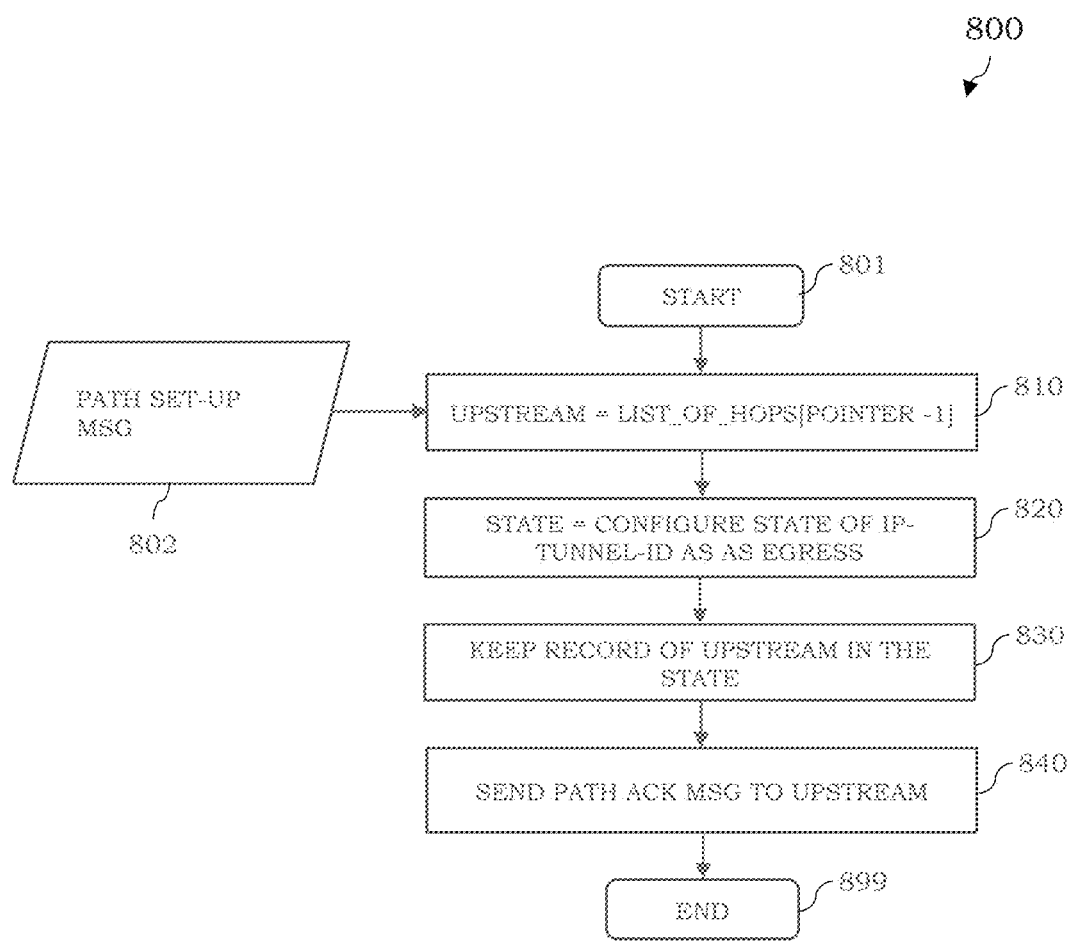
FIG. 8 depicts an example embodiment of a method for use by an egress node for processing a path setup message associated with configuration of a stateful explicit path.

FIG. 8 depicts an example embodiment of a method for use by an egress node for processing a path setup message associated with configuration of a stateful explicit path. It is assumed that the determination of the node being egress for the path has already been made before this method is invoked, such as may be done by block 703 in FIG. 7. It is noted that this method may be used as block 726 in the method 700 of FIG. 7. At block 801, the method 800 begins. The input 802 to the method 800 is a path set-up message received from a neighboring node. Block 810 finds the upstream node of the path setup message, which is List_of_hops[pointer−1], and the method 800 then proceeds to block 820. Block 820 configures the state of the IP-Tunnel-ID of the message with this node as the egress, and the method 800 then proceeds to block 830. Block 830 marks the upstream node with the state of the Tunnel-ID so that control protocol messages can be sent to the upstream, as needed, and the method 800 then proceeds to block 840. Block 840 originates a path ACK message to the upstream indicating completion of set-up of the path, and the method 800 proceeds to block 899 where the method 800 ends. At block 899, the method 800 ends.

Figure 9:
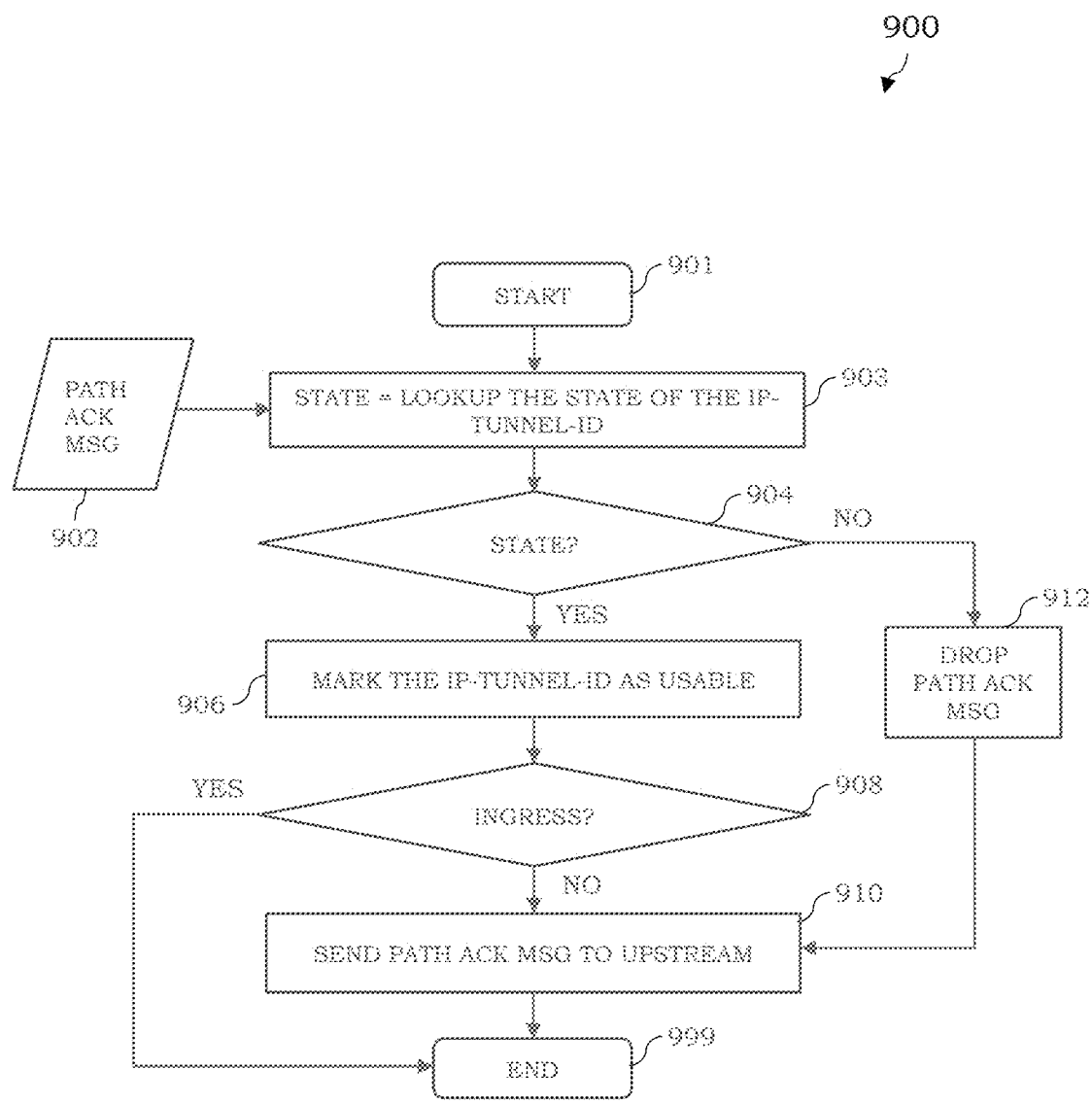
FIG. 9 depicts an example embodiment of a method for use by a node for processing a path acknowledgement message associated with configuration of a stateful explicit path.

FIG. 9 depicts an example embodiment of a method for use by a node for processing a path acknowledgement message associated with configuration of a stateful explicit path. At block 901, the method 900 begins. The input 902 to method 900 is a path ACK message received from a neighboring node. Block 903 looks up the state of the IP-Tunnel-ID encoded in the path ACK message, and the method 900 then proceeds to block 904. Block 904 checks if the state of the IP-Tunnel-ID encoded in the path ACK message is found. If the state of the IP-Tunnel-ID encoded in the path ACK message is not found then the method 900 proceeds to block 912, otherwise the method 900 proceeds to block 906.

Block 912 drops the path ACK message since a corresponding state is not found and the method 900 then proceeds to block 999 where the method 900 ends. Block 906 marks the state of the IP-Tunnel-ID as usable, which means that the path is now ready for transporting traffic, and the method 900 then proceeds to block 908. Block 908 checks if the node is ingress for the IP-Tunnel-ID. If the node is ingress for the IP-Tunnel-ID, then there is nothing more to do and the method 900 then proceeds to block 999 where the method 900 ends, otherwise the method 900 proceeds to block 910. Block 910 propagates the path ACK message to the upstream node associated with the state of the IP-Tunnel-ID, and the method 900 then proceeds to block 999 where the method 900 ends. At block 999, the method 900 ends.

Figure 10:
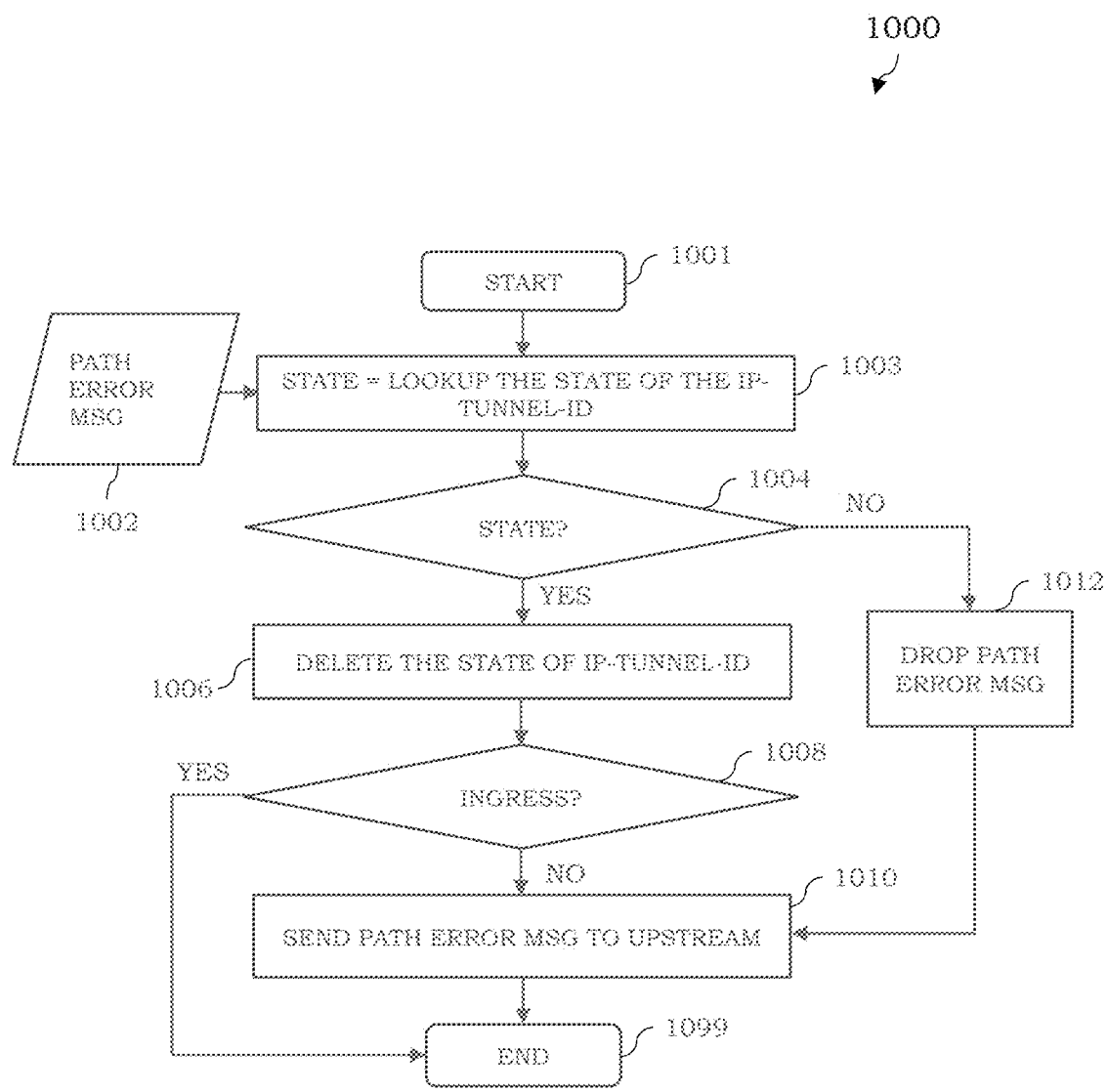
FIG. 10 depicts an example embodiment of a method for use by a node for processing a path error message associated with configuration of a stateful explicit path.

FIG. 10 depicts an example embodiment of a method for use by a node for processing a path error message associated with configuration of a stateful explicit path. At block 1001, the method 1000 begins. The input 1002 to the method 1000 is a path error message received from a neighboring node. Block 1003 looks up the state of the IP-Tunnel-ID encoded in the path error message, and the method 1000 then proceeds to block 1004. Block 1004 checks if the state of the IP-Tunnel-ID encoded in the path error message is found. If the state of the IP-Tunnel-ID encoded in the path error message is not found then the method 1000 proceeds to block 1012, otherwise the method 1000 proceeds to block 1006. Block 1012 drops the path error message since a corresponding state is not found and the method 1000 then proceeds to block 1099 where the method 1000 ends. Block 1006 deletes the state of the IP-Tunnel-ID and the method 1000 then proceeds to block 1008. Block 1008 checks if the node is ingress for the IP-Tunnel-ID. If the node is ingress for the IP-Tunnel-ID, then there is nothing more to do and the method proceeds to block 1099 where the method 1000 ends, otherwise the method 1000 proceeds to block 1010. Block 1010 propagates the path error message to the upstream node associated with the state of the IP-Tunnel-ID and the method proceeds to block 1099 where the method 1000 ends. At block 1099, the method 1000 ends.

Various example embodiments may be configured to support use of various other control plane methods for supporting configuration of a stateful explicit path across an IP network.

Various example embodiments may be configured to support use of data plane methods for supporting transport of packets on a stateful explicit path across an IP network.

Figure 11:
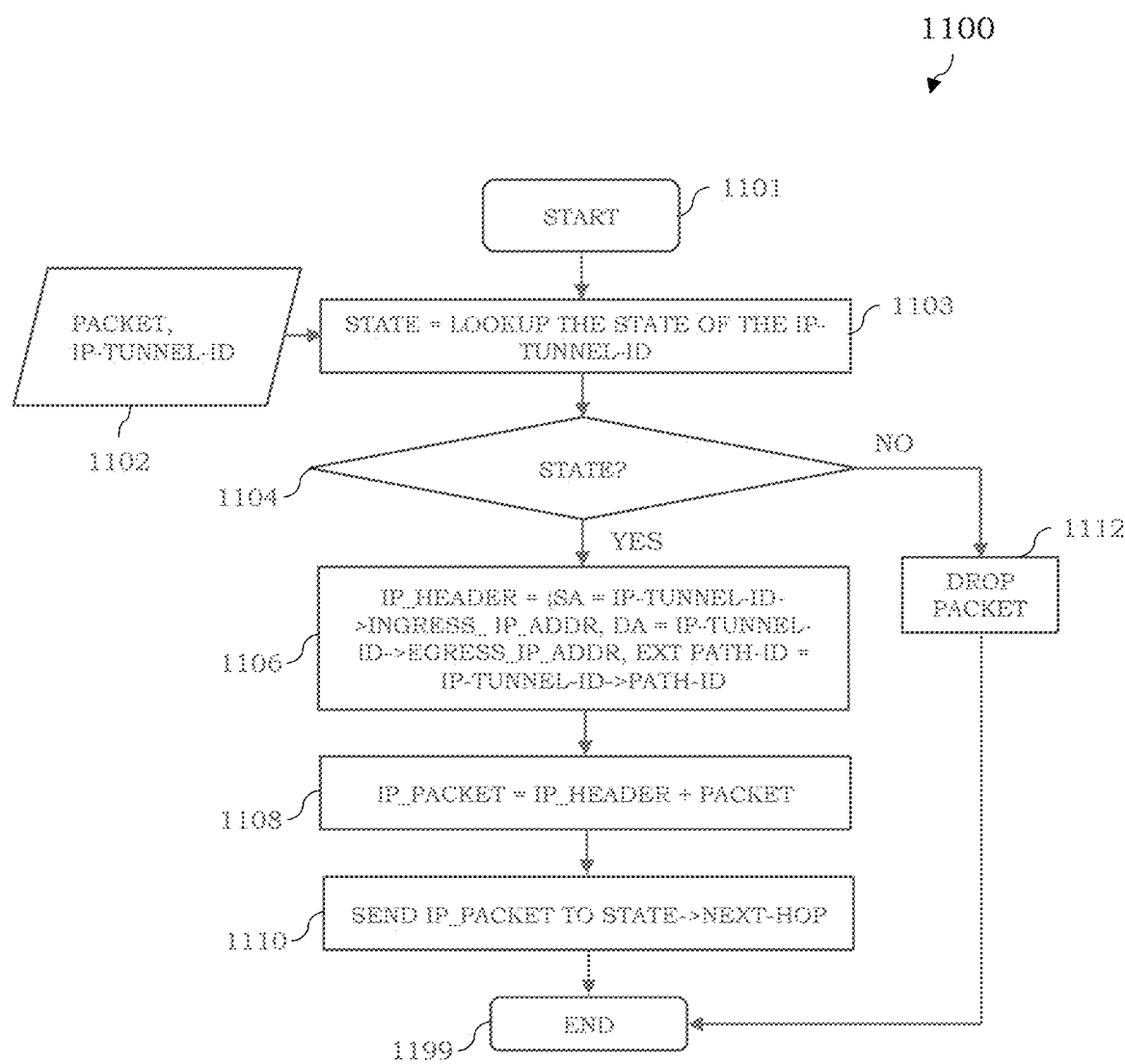
FIG. 11 depicts an example embodiment of a method for use by an ingress node for sending a packet on a stateful explicit path.

FIG. 11 depicts an example embodiment of a method for use by an ingress node for sending a packet on a stateful explicit path. At block 1101, the method 1100 begins. The inputs 1102 to the method include a packet to be sent on the path and the IP-Tunnel-ID of the path. Block 1103 looks up the state of the IP-Tunnel-ID, and the method 1100 then proceeds to block 1104. Block 1104 checks if the state of the IP-Tunnel-ID exists. If the state of the IP-Tunnel-ID exists then the method 1100 proceeds to block 1106, otherwise the method 1100 proceeds to block 1112. Block 1112 drops the packet and the method 1100 then proceeds to block 1100, where the method 1100 ends. Block 1106 builds an IP header with Ingress_IP_addr of IP-Tunnel-ID as the SA, Egress_IP_addr of IP-Tunnel-ID as the DA, and Path-ID as its extended header. From block 1106, the method 1100 proceeds to block 1108. Block 1108 pushes the IP header onto the packet, and the method 1100 then proceeds to block 1110. Block 1110 sends the resultant IP packet to the next-hop in the state of the IP-Tunnel-ID and the method 1100 then proceeds to block 1199 where the method 1100 ends. At block 1199, the method 1100 ends.

Figure 12:
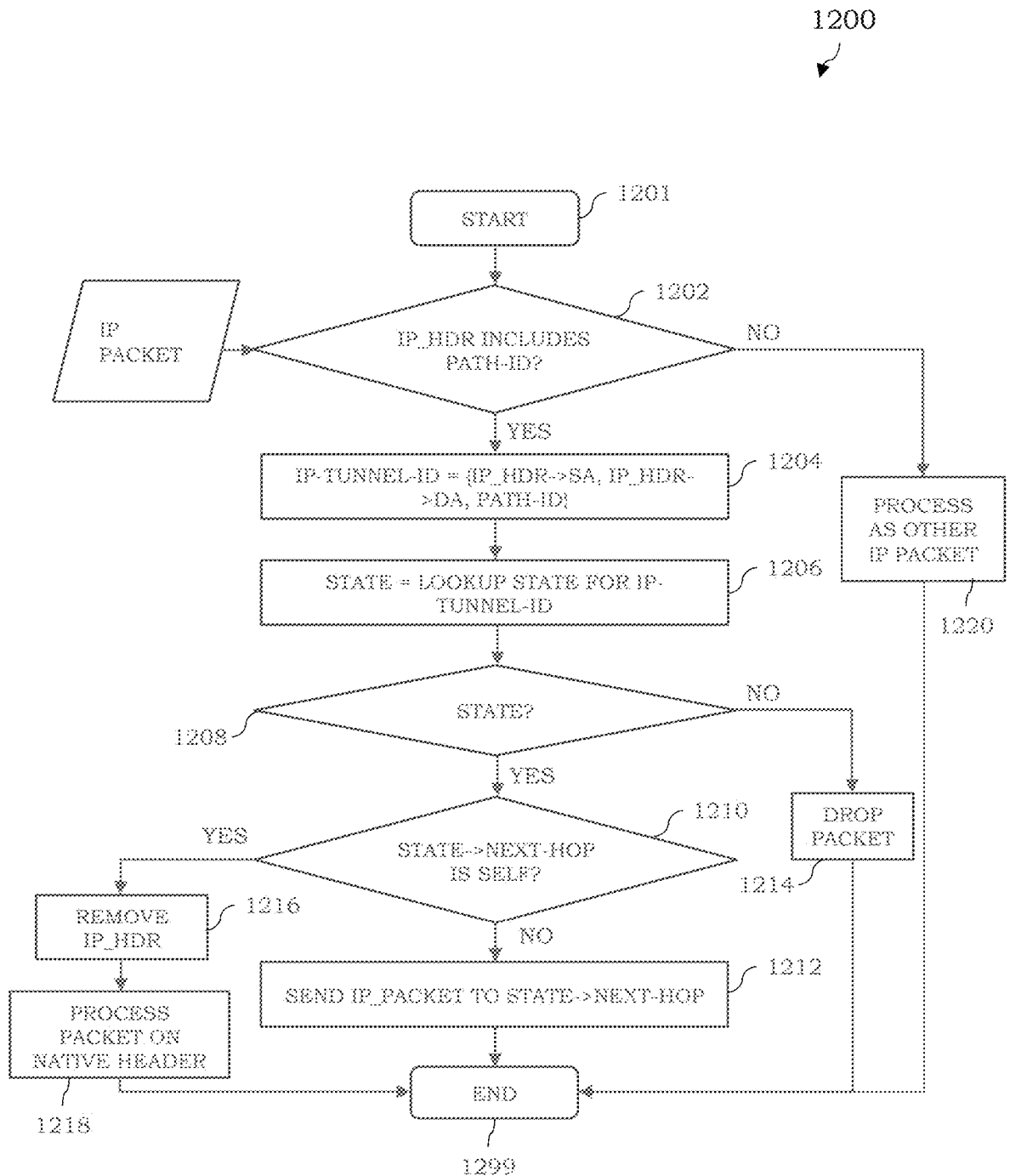
FIG. 12 depicts an example embodiment of a method for use by a transit node or an egress node for processing a packet on a stateful explicit path.

FIG. 12 depicts an example embodiment of a method for use by a transit node or an egress node for processing a packet on a stateful explicit path. At block 1201, the method 1200 begins. The input 1202 to the method 1200 is an IP packet received by the node from a neighboring link. Block 1203 checks if the IP header includes a Path-ID. If the IP header includes a Path-ID then the method 1200 proceeds to block 1204, otherwise the method 1200 proceeds to block 1220. Block 1220 processes the packet as other types of IP packets, and the method 1200 then proceeds to block 1299 where the method 1200 ends. Block 1204 builds the IP-Tunnel-ID from the SA, DA, and Path-ID fields in the IP header, and the method 1200 then proceeds to block 1206. Block 1206 looks up the state for the IP-Tunnel-ID and the method 1200 then proceeds to block 1208. Block 1208 checks if the state for the IP-Tunnel-ID is found. If the state for the IP-Tunnel-ID is not found then the method 1200 proceeds to block 1214, otherwise the method 1200 proceeds to block 1210. Block 1214 drops the packet, and method 1200 then proceeds to block 1299 where the method 1200 ends. Block 1210 checks if the state of the IP-Tunnel-ID indicates this node as the egress for the path. If this node is the egress node for the path then the method 1200 proceeds to block 1216, otherwise the method 1200 proceeds to block 1212. Block 1212 sends the IP packet to the next-hop associated with the state of the IP-Tunnel-ID, and the method 1200 then proceeds to block 1299 where the method 1200 ends. Block 1216 removes the IP header since the packet has reached the egress node of the path, and the method 1200 then proceeds to block 1218. Block 1218 processes the resultant packet based on its native header and the method 1200 then proceeds to block 1299 where the method 1200 ends.

Various example embodiments may be configured to support use of various other data plane methods for supporting transport of packets on a stateful explicit path across an IP network.

Various example embodiments may be configured to support the encoding of the Path-ID into an IPv4 Header in various ways.

IPv4 supports several Options that can be appended to an IPv4 Header, and various example embodiments may be configured to support encoding of the Path-ID into the IPv4 Header as an IPv4 Option in the IPv4 Header.

Figure 13:
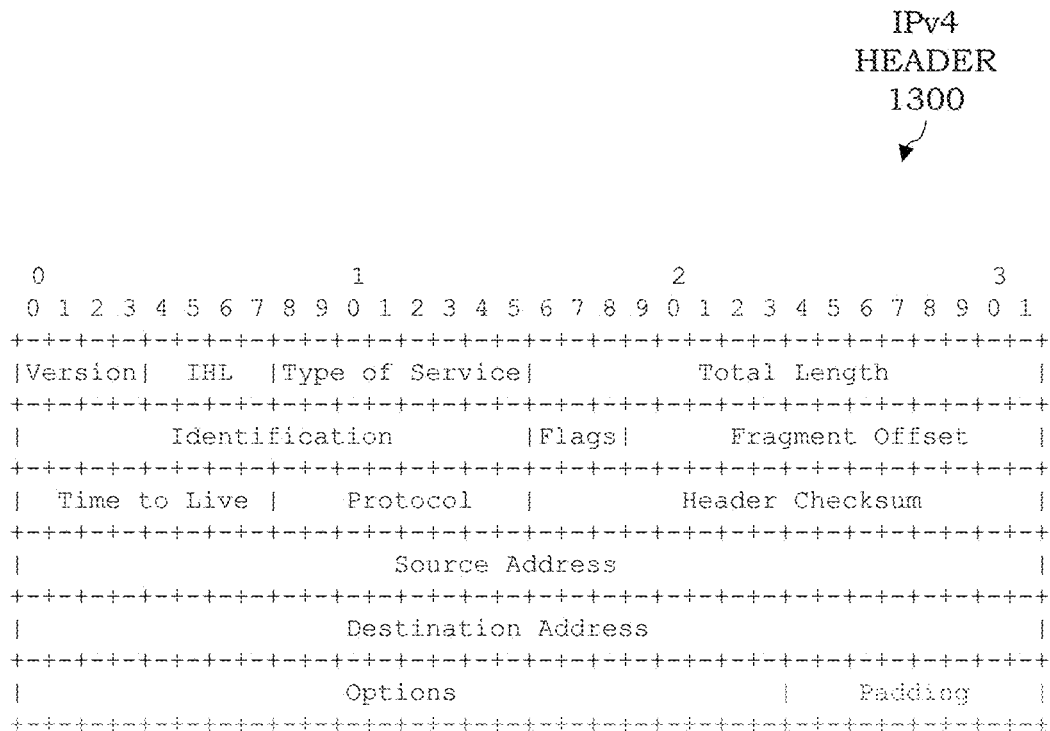
FIG. 13 depicts an example embodiment of an IPv4 Header configured for use to support encapsulation of packets sent on a stateful explicit path.

FIG. 13 depicts an example embodiment of an IPv4 Header configured for use to support encapsulation of packets sent on a stateful explicit path. In the IPv4 Header 1300, the Options provide for control functions needed or useful in some situations but unnecessary for the most common communications. For example, the Options include provisions for timestamps, security, and special routing. Each Option starts with a 1-octet type field followed by a type-specific encoding. Options are of variable length. Thus, the minimum size of an Option is 1-octet (Only type) if it does not have any type specific data. Maximum size of an Option is limited by maximum permissible value of IP Header Length (IHL) field in the IPV4 Header. The 1-octet Type is viewed as having 3 fields: (1) a 1 bit copied flag field, (2) a 2 bit option class field, and (3) a 5 bit option number field. The copied flag indicates whether or not the Option is copied into all fragments on fragmentation (e.g., 0=not copied and 1=copied). The option classes are: (a) 0=control, (b) 1=reserved for future use, (c) 2=debugging and measurement, and (d) 3=reserved for future use. Various example embodiments may be configured to support implementation of stateful explicit paths in IPv4 networks based on implementation of the Path-ID as an IPv4 Option referred to as the Path-ID Option (or Tunnel-ID Option). An example format of a Path-ID Option is presented with respect to FIG. 14.

Figure 14:
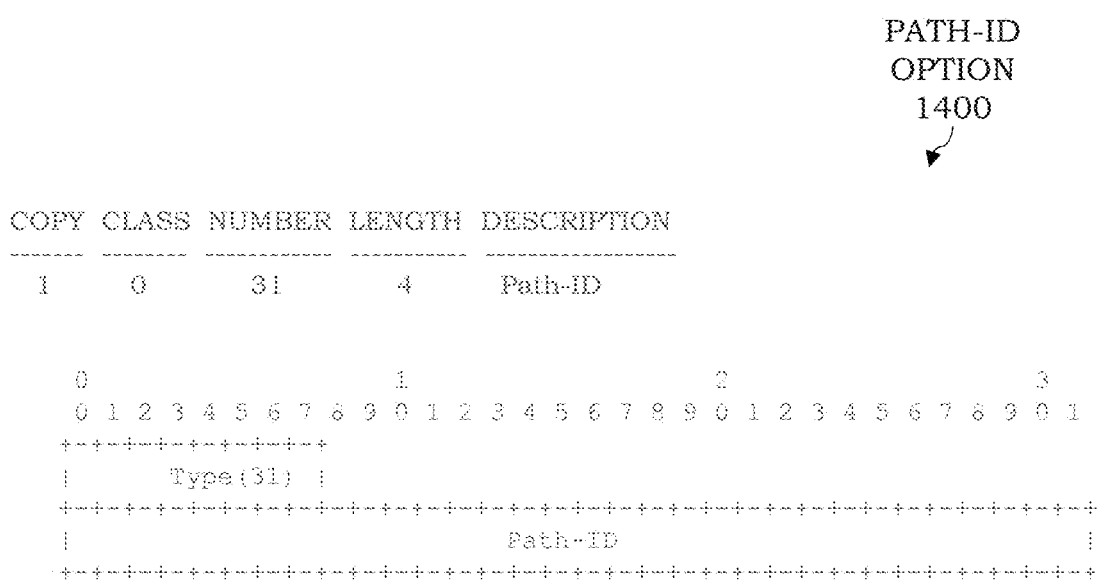
FIG. 14 depicts an example embodiment of a Path-ID option for use in the IPv4 header of FIG. 13 to support encapsulation of packets sent on a stateful explicit path.

FIG. 14 depicts an example embodiment of a Path-ID Option for use in the IPv4 header of FIG. 13 to support encapsulation of packets sent on a stateful explicit path.

The Path-ID Option 1400 includes a Type field and a Path-ID field. The Type field is a 1-octet field that indicates the Path-ID Option in tuples of COPY, CLASS and NUMBER, which is 31. The Path-ID field is a 32-bit field that encodes the Path-ID.

Various example embodiments may be configured to support the encoding of the Path-ID into an IPv4 Header in various other ways.

Various example embodiments may be configured to support the encoding of the Path-ID into an IPv6 Header in various ways.

IPv6 supports several IPv6 Extension Headers (EHs) that can be appended to an IPv6 Header, and various example embodiments may be configured to support encoding of the Path-ID in an IPv6 Header using an IPv6 EH.

Figure 15:
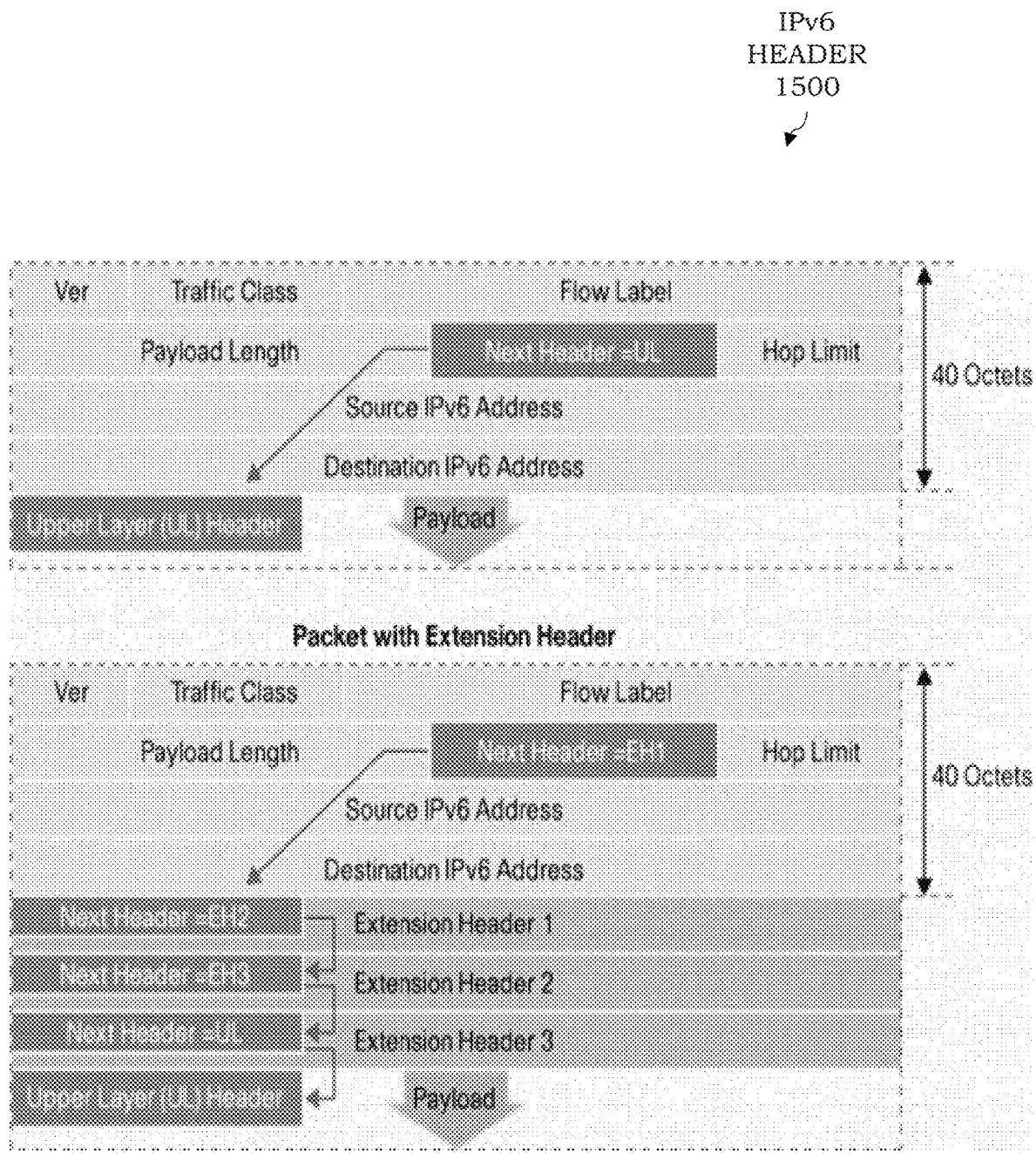
FIG. 15 depicts an example embodiment of an IPv6 Header configured for use to support encapsulation of packets sent on a stateful explicit path.

FIG. 15 depicts an example embodiment of an IPv6 Header configured for use to provide a Path-ID. In the IPv6 Header 1500, the main IPv6 header remains fixed in size (40 bytes) while customized EHs are added as needed. The EHs provide for control functions needed or useful in some situations but unnecessary for the most common communications. For example, the EHs include provisions for timestamps, security, and special routing. Each EH starts with a 1-octet Next Header field, followed by its own body. The format of the body is dependent on the type of EH. The Next Header field of an EH points to the type of the next EH. So, multiple EHs are chained together by their Next Header fields. The Next Header field on the last EH in the chain indicates the type of the IPv6 payload. Section 4.3 in the IPv6 specification describes an EH referred to as a "Hop-by-Hop Options Header" that can be used to carry optional information that must be examined by each router along the delivery path of the packet. It is identified by the value of 0 in the Next Header field of the IPv6 Header or an EH. This EH is generic and multiple options can be defined within the EH. So, any special directive to be examined by each transit router of an IPv6 packet is defined as an option within the Hop-by-Hop Options Header. An example format of a Hop-by-Hop Options Header is presented with respect to FIG. 16.

Figure 16:
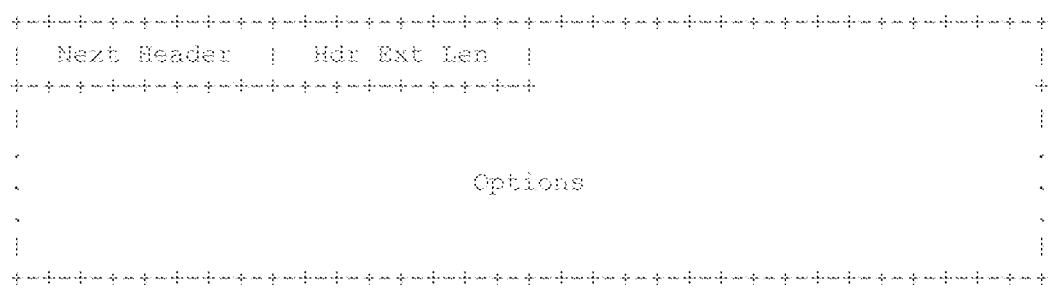
FIG. 16 depicts an example embodiment of a Hop-By-Hop Options Header for use in the IPv6 Header of FIG. 15 to support encapsulation of packets sent on a stateful explicit path.

FIG. 16 depicts an example embodiment of a Hop-By-Hop Options Header for use in the IPv6 Header of FIG. 15 to support encapsulation of packets sent on a stateful explicit path. The Hop-by-Hop Options Header 1600 includes a Next Header field, a Header Extension Length field, and an Options field. The Next Header is an 8-bit selector that identifies the type of header immediately following the Hop-by-Hop Options header. The Header Extension Length field is an 8-bit unsigned integer that indicates the length of the Hop-by-Hop Options header in 8-octet units, not including the first 8 octets. The Options field is a variable-length field of length such that the complete Hop-by-Hop Options header is an integer multiple of 8 octets long. The Options field includes one or more TLV-encoded options. An example format of a TLV encoded option configured for use in the Hop-By-Hop Options Header of FIG. 16, to provide a Path-ID to support encapsulation of packets sent on a stateful explicit path, is presented with respect to FIG. 17.

Figure 17:
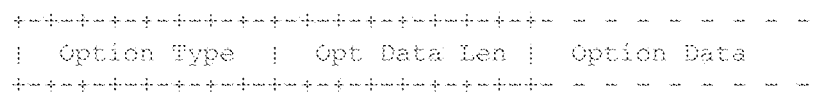
FIG. 17 depicts an example embodiment of a Type-Length-Value (TLV) encoded option for use in the Hop-By-Hop Options Header of FIG. 16 to support encapsulation of packets sent on a stateful explicit path.

FIG. 17 depicts an example embodiment of TLV-encoded option for use in the Hop-By-Hop Options Header of FIG. 16 to support encapsulation of packets sent on a stateful explicit path.

The TLV-encoded option 1700 includes an Option Type field, an Option Data Length field, and an Option Data field. The Option Type field is an 8-bit identifier of the type of option. The Option Data Length field is an 8-bit unsigned integer that indicates the length of the Option Data field of this option, in octets. The Option Data field is a variable-length field that includes Option-Type-specific data.

The Hop-by-Hop Options Header, as indicated above, supports encapsulation of packets sent on stateful explicit paths in IPv6 networks. The sequence of Options within an IPv6 Header will be processed strictly in the order that the Options appear in the header. A receiver will not, for example, scan through the header looking for a particular kind of option and process that option prior to processing all preceding ones.

The Option Type identifiers are internally encoded such that the highest-order two bits specify the action to be taken if the processing IPv6 node does not recognize the Option Type: (a) 00—skip over this option and continue processing the header, (b) 01—discard the packet, (c) 10—discard the packet and, regardless of whether or not the Destination Address of the packet was a multicast address, send an ICMP Parameter Problem, Code 2, message to the Source Address of the packet, pointing to the unrecognized Option Type, and (d) 11—discard the packet and, only if the Destination Address of the packet was not a multicast address, send an ICMP Parameter Problem, Code 2, message to the Source Address of the packet, pointing to the unrecognized Option Type.

The Option Type identifiers are internally encoded such that the third-highest-order bit of the Option Type specifies whether or not the Option Data of that option can change en-route to the final destination of the packet: (a) 0—Option Data does not change en-route and (b) 1—Option Data may change en-route. When an Authentication Header (another type of EH that carries an authentication digest of the packet) is present in the packet, for any option whose data may change en-route, its entire Option Data field will be treated as zero-valued octets when computing or verifying the authenticating digest of the packet.

The three high-order bits described above are to be treated as part of the Option Type, not independent of the Option Type. That is, a particular option is identified by a full 8-bit Option Type, not just the low-order 5 bits of an Option Type. The Option Type for the Hop-by-Hop Options Header for stateful explicit paths is referred to as a Path-ID Option. An example format of a Path-ID Option is presented with respect to FIG. 18.

Figure 18:
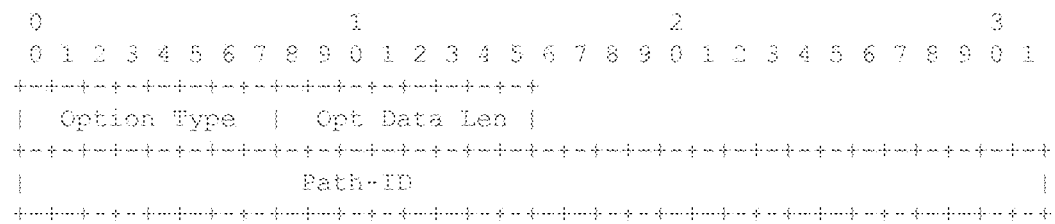
FIG. 18 depicts an example embodiment of a Path-ID Option, based on the TLV encoded option of FIG. 17, for use in the Hop-By-Hop Options Header of FIG. 16 to support encapsulation of packets sent on a stateful explicit path.

FIG. 18 depicts an example embodiment of a Path-ID Option, based on the TLV-encoded option of FIG. 17, for use in the Hop-By-Hop Options Header of FIG. 16 to support encapsulation of packets sent on a stateful explicit path.

The Path-ID Option 1800 includes an Option Type field, an Option Data Length field, and a Path-ID field. The Option Type field encodes the option type that indicates it as Path-ID Option. The highest-order 2-bits are encoded with the value 10, which indicates to discard the packet and, regardless of whether or not the Destination Address of the packet was a multicast address, send an ICMP Parameter Problem, Code 2, message to the Source Address of the packet, pointing to the unrecognized Option Type. The $3^{rd}$ highest order bit is encoded with the value 0, which indicates that the Option Data cannot change en-route, because the content of the Path-ID Option does not change at each hop/router. The remaining 5-bits are assigned the value 10010, which results in the value of Option Type field as 0x92. The Option Data Length field has a value of 4, indicating that the size of the Path-ID field is 4 B. The Path-ID field is a 32-bit field that encodes the Path-ID.

When a router routes an IPv6 packet that includes a Hop-by-Hop Options Header, it checks to see if the Path-ID option is present within the IPv6 Header. If the Path-ID option is present within the IPv6 Header, the router parses the Path-ID and processes the IPv6 Header for the IP-Tunnel-ID.

Various example embodiments may be configured to support the encoding of the Path-ID into an IPv6 Header in various other ways.

It will be appreciated that information associated with support for stateful explicit paths (e.g., stateful explicit paths, state information of stateful explicit paths, or the like, as well as various combinations thereof) may be exposed to various management interfaces, including user management interfaces, such as command line interfaces (CLIs), Simple Network Management Protocol (SNMP) interfaces, or the like, as well as various combinations thereof.

Figure 19:
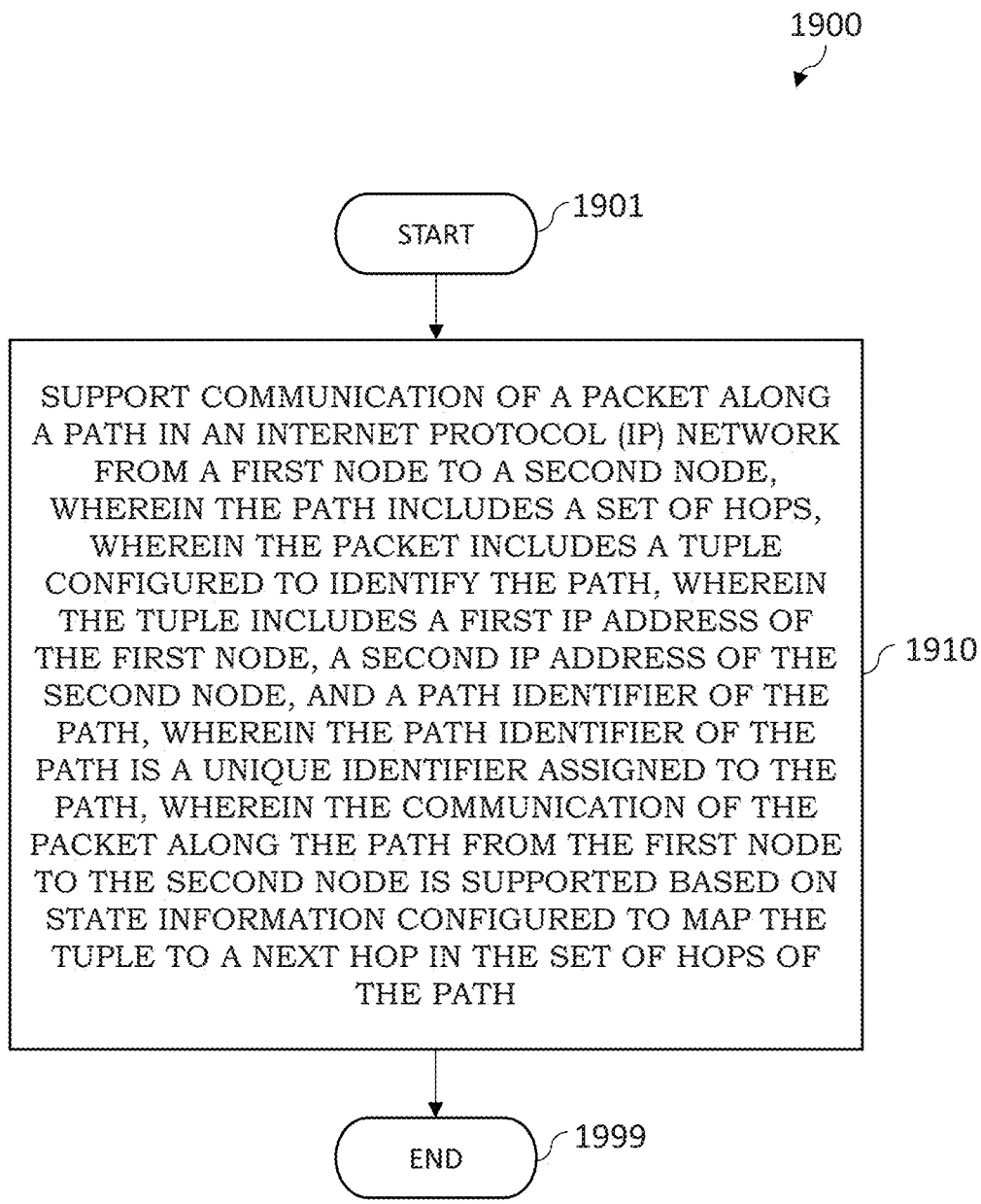
FIG. 19 depicts an example embodiment of a method for supporting communications based on stateful explicit paths.

FIG. 19 depicts an example embodiment of a method for supporting communications based on stateful explicit paths. It will be appreciated that, although primarily presented herein as being performed serially, at least a portion of the functions of method 1900 may be performed contemporaneously or in a different order than as presented in FIG. 19. At block 1901, the method 1900 begins. At block 1910, support communication of a packet along a path in an Internet Protocol (IP) network from a first node to a second node, wherein the path includes a set of hops, wherein the packet includes a tuple configured to identify the path, wherein the tuple includes a first IP address of the first node, a second IP address of the second node, and a path identifier of the path, wherein the path identifier of the path is a unique identifier assigned to the path, wherein the communication of the packet along the path from the first node to the second node is supported based on state information configured to map the tuple to a next hop in the set of hops of the path. At block 1999, the method 1900 ends.

Figure 20:
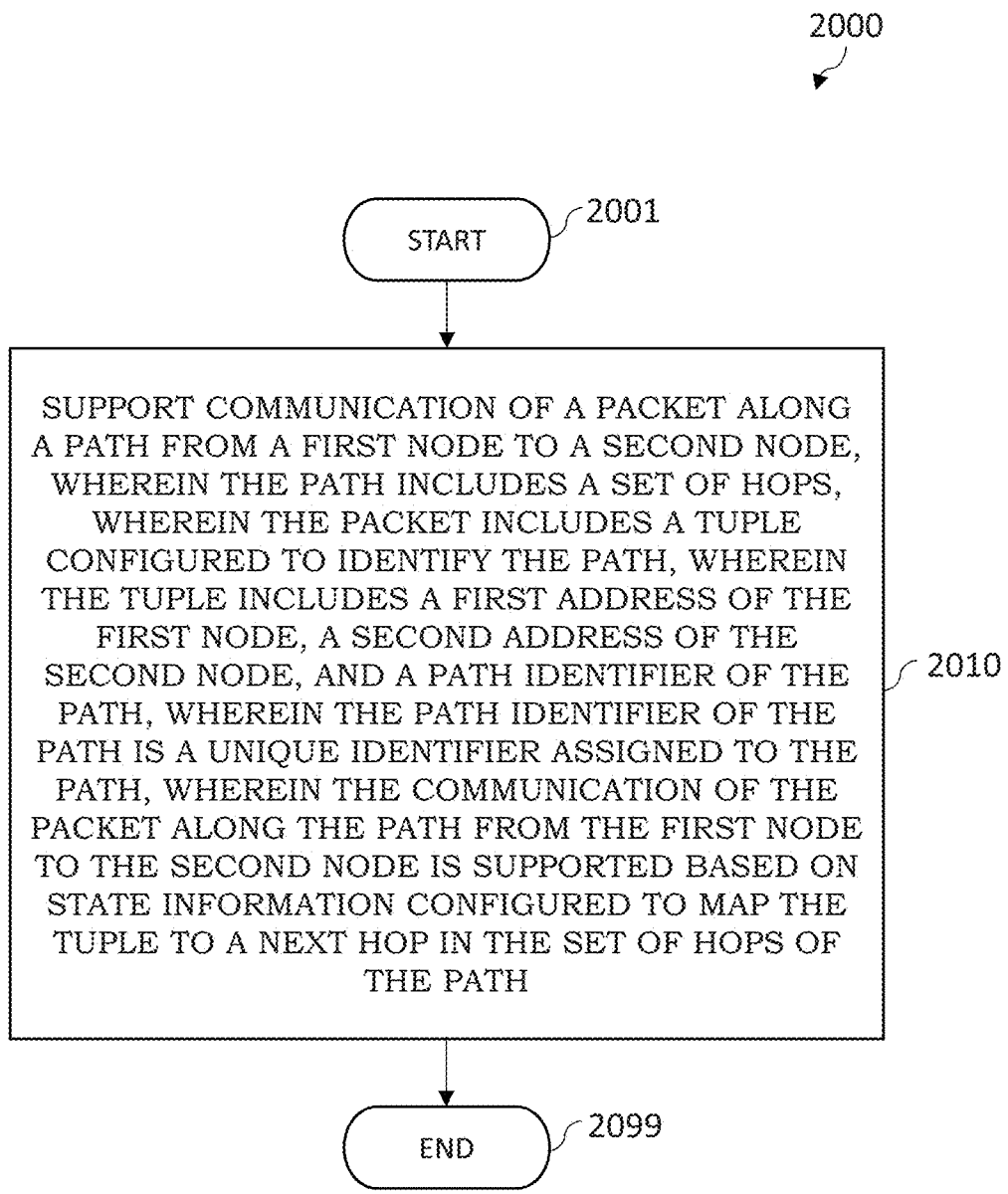
FIG. 20 depicts an example embodiment of a method for supporting communications based on stateful explicit paths.

FIG. 20 depicts an example embodiment of a method for supporting communications based on stateful explicit paths. It will be appreciated that, although primarily presented herein as being performed serially, at least a portion of the functions of method 2000 may be performed contemporaneously or in a different order than as presented in FIG. 20. At block 2001, the method 2000 begins. At block 2010, support communication of a packet along a path from a first node to a second node, wherein the path includes a set of hops, wherein the packet includes a tuple configured to identify the path, wherein the tuple includes a first address of the first node, a second address of the second node, and a path identifier of the path, wherein the path identifier of the path is a unique identifier assigned to the path, wherein the communication of the packet along the path from the first node to the second node is supported based on state information configured to map the tuple to a next hop in the set of hops of the path. At block 2099, the method 2000 ends.

Various example embodiments for supporting communications based on stateful explicit paths may provide various advantages or potential advantages. For example, various example embodiments for supporting communications based on stateful explicit paths may be configured to enable stateful explicit paths in IP networks without additional overhead other than the IP header. For example, various example embodiments for supporting communications based on stateful explicit paths may be configured to enable TE in IP networks without additional overhead other than the IP header. Various example embodiments for supporting communications based on stateful explicit paths may provide various other advantages or potential advantages.

Figure 21:
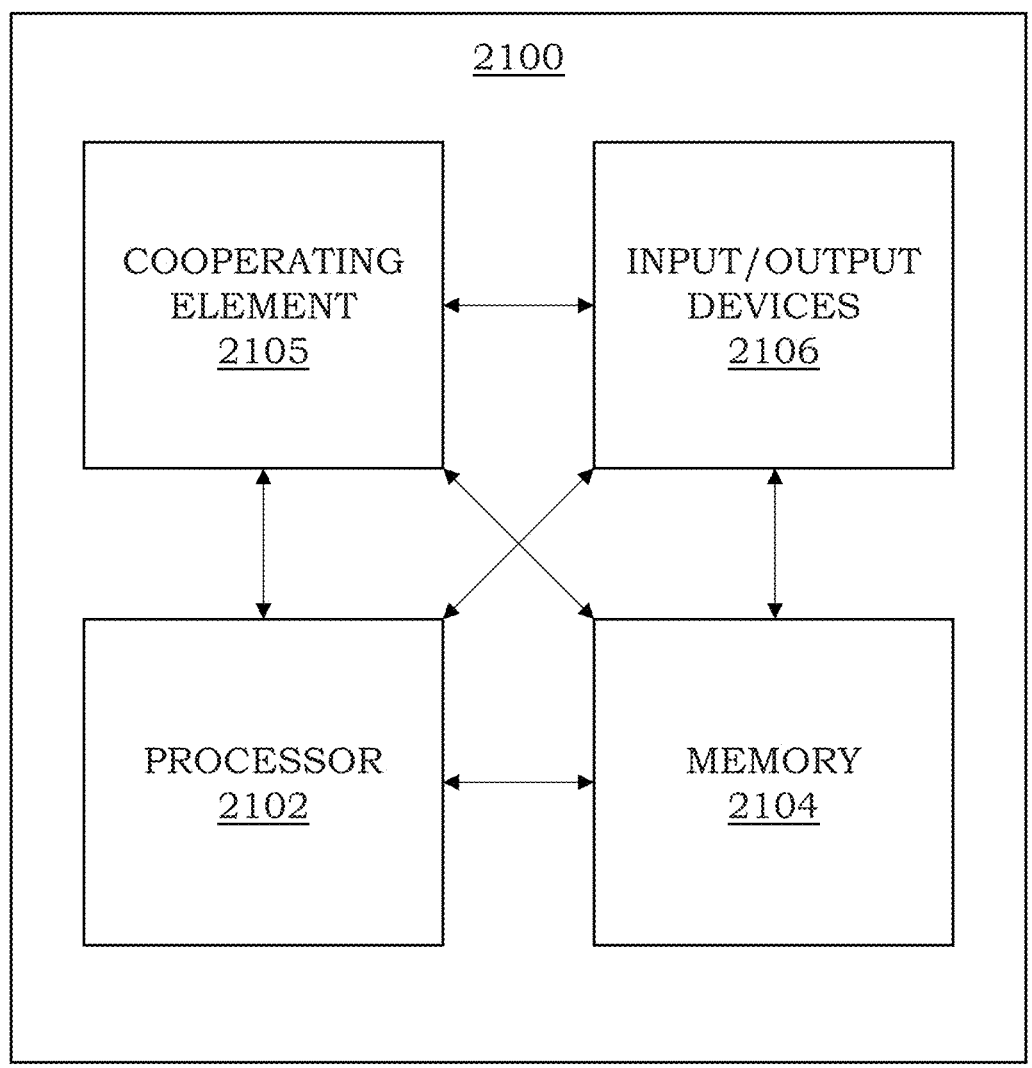
FIG. 21 depicts an example embodiment of a computer suitable for use in performing various functions presented herein.

FIG. 21 depicts an example embodiment of a computer suitable for use in performing various functions presented herein.

The computer 2100 includes a processor 2102 (e.g., a central processing unit (CPU), a processor, a processor having a set of processor cores, a processor core of a processor, or the like) and a memory 2104 (e.g., a random access memory, a read only memory, or the like). The processor 2102 and the memory 2104 may be communicatively connected. In at least some example embodiments, the computer 2100 may include at least one processor and at least one memory including computer program code, wherein the at least one memory and the computer program code are configured to, with the at least one processor, cause the computer to perform various functions presented herein.

The computer 2100 also may include a cooperating element 2105. The cooperating element 2105 may be a hardware device. The cooperating element 2105 may be a process that can be loaded into the memory 2104 and executed by the processor 2102 to implement various functions presented herein (in which case, for example, the cooperating element 2105 (including associated data structures) can be stored on a non-transitory computer-readable storage medium, such as a storage device or other suitable type of storage element (e.g., a magnetic drive, an optical drive, or the like)).

The computer 2100 also may include one or more input/output devices 2106. The input/output devices 2106 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 2100 may represent a general architecture and functionality suitable for implementing functional elements described herein, portions of functional elements described herein, or the like, as well as various combinations thereof. For example, computer 2100 may provide a general architecture and functionality that is suitable for implementing one or more elements presented herein, such as a node or a portion thereof, a controller or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor; and
at least one memory storing instructions which, when executed by the at least one processor, cause the apparatus at least to:
support communication of a packet along a path in an Internet Protocol (IP) network from a first node to a second node, wherein the path includes a set of hops, wherein the packet includes a tuple configured to identify the path, wherein the tuple includes a first IP address of the first node, a second IP address of the second node, and a path identifier of the path, wherein the path identifier of the path is a unique identifier assigned to the path, wherein the communication of the packet along the path from the first node to the second node is supported based on state information configured to map the tuple to a next hop in the set of hops of the path; and
support communication of a second packet along a second path from the first node to the second node in the IP network, wherein the second path traverses the set of hops, wherein the second packet includes a second tuple configured to identify the second path, wherein the second tuple includes the first IP address of the first node, the second IP address of the second node, and a second path identifier of the second path, wherein the communication of the second packet is supported based on second state information of the second path configured to map the second tuple to a next hop in the set of hops.

2. The apparatus of claim 1, wherein the set of hops of the path includes a set of network elements of which the path is composed, wherein the set of network elements includes at least one of a set of nodes or a set of links.

3. The apparatus of claim 1, wherein at least one of the path identifier is unique to the first node or the path identifier is unique within the IP network.

4. The apparatus of claim 1, wherein the path identifier is assigned to the path by the first node or by a controller.

5. The apparatus of claim 1, wherein, to support communication of the packet, the instructions, when executed by the at least one processor, cause the apparatus at least to:
send, by a node, a path setup message including the tuple configured to identify the path and a hops list including hop identifiers of the respective hops of the path.

6. The apparatus of claim 1, wherein, to support communication of the packet, the instructions, when executed by the at least one processor, cause the apparatus at least to:
receive, by a node, a path setup message including the tuple configured to identify the path and a hops list including hop identifiers of the respective hops of the path; and
determine, by the node from a local perspective of the node based on the hops list, the next hop in set of hops of the path.

7. The apparatus of claim 6, wherein the path setup message includes at least one of:
a pointer configured to point to a current hop in the hops list, wherein the next hop in the set of hops of the path is determined based on the pointer; or
an indication of resources to be reserved on the next hop in the set of hops of the path.

8. The apparatus of claim 1, wherein, to support communication of the packet, the instructions, when executed by the at least one processor, cause the apparatus at least to:
receive, based on a control protocol, the state information configured to map the tuple to the next hop in the set of hops of the path; and
store the state information configured to map the tuple to the next hop in the set of hops of the path.

9. The apparatus of claim 1, wherein, to support communication of the packet, the instructions, when executed by the at least one processor, cause the apparatus at least to:
receive, by a node, the packet;
determine, by the node based on the tuple from the packet and based on the state information configured to map the tuple to the next hop in the set of hops of the path, the next hop in the set of hops of the path; and
send, by the node toward the next hop in the set of hops of the path, the packet.

10. The apparatus of claim 1, wherein, to support communication of the packet, the instructions, when executed by the at least one processor, cause the apparatus at least to:
determine, by the node based on the tuple from the packet and based on the state information configured to map the tuple to the next hop in the set of hops of the path, that the node is the second node of the path; and
perform, by the node, processing for removing the packet from the path.

11. An apparatus, comprising:
at least one processor; and
at least one memory storing instructions which, when executed by the at least one processor, cause the apparatus at least to:
support communication of a packet along a path in an Internet Protocol (IP) network from a first node to a second node, wherein the path includes a set of hops, wherein the packet includes a tuple configured to identify the path, wherein the tuple includes a first IP address of the first node, a second IP address of the second node, and a path identifier of the path, wherein the path identifier of the path is a unique identifier assigned to the path, wherein the communication of the packet along the path from the first node to the second node is supported based on state information configured to map the tuple to a next hop in the set of hops of the path; and
support communication of a second packet along a second path from the first node to the second node in the IP network, wherein the second path traverses a second set of hops which is different than the first set of hops of the first path, wherein the second packet includes a second tuple configured to identify the second path, wherein the second tuple includes the first IP address of the first node, the second IP address of the second node, and a second path identifier of the second path, wherein the communication of the second packet is supported based on second state information of the second path configured to map the second tuple to a next hop in the second set of hops of the second path.

12. The apparatus of claim 11, wherein the set of hops of the path includes a set of network elements of which the path is composed, wherein the set of network elements includes at least one of a set of nodes or a set of links.

13. The apparatus of claim 11, wherein at least one of the path identifier is unique to the first node or the path identifier is unique within the IP network.

14. The apparatus of claim 11, wherein the path identifier is assigned to the path by the first node or by a controller.

15. The apparatus of claim 11, wherein, to support communication of the packet, the instructions, when executed by the at least one processor, cause the apparatus at least to:
send, by a node, a path setup message including the tuple configured to identify the path and a hops list including hop identifiers of the respective hops of the path.

16. The apparatus of claim 11, wherein, to support communication of the packet, the instructions, when executed by the at least one processor, cause the apparatus at least to:
receive, by a node, a path setup message including the tuple configured to identify the path and a hops list including hop identifiers of the respective hops of the path; and
determine, by the node from a local perspective of the node based on the hops list, the next hop in set of hops of the path.

17. The apparatus of claim 16, wherein the path setup message includes at least one of:
a pointer configured to point to a current hop in the hops list, wherein the next hop in the set of hops of the path is determined based on the pointer; or
an indication of resources to be reserved on the next hop in the set of hops of the path.

18. The apparatus of claim 11, wherein, to support communication of the packet, the instructions, when executed by the at least one processor, cause the apparatus at least to:
receive, based on a control protocol, the state information configured to map the tuple to the next hop in the set of hops of the path; and
store the state information configured to map the tuple to the next hop in the set of hops of the path.

19. The apparatus of claim 11, wherein, to support communication of the packet, the instructions, when executed by the at least one processor, cause the apparatus at least to:
receive, by a node, the packet;
determine, by the node based on the tuple from the packet and based on the state information configured to map the tuple to the next hop in the set of hops of the path, the next hop in the set of hops of the path; and
send, by the node toward the next hop in the set of hops of the path, the packet.

20. The apparatus of claim 11, wherein, to support communication of the packet, the instructions, when executed by the at least one processor, cause the apparatus at least to:
determine, by the node based on the tuple from the packet and based on the state information configured to map the tuple to the next hop in the set of hops of the path, that the node is the second node of the path; and
perform, by the node, processing for removing the packet from the path.

21. A method, comprising:
supporting communication of a packet along a path in an Internet Protocol (IP) network from a first node to a second node, wherein the path includes a set of hops, wherein the packet includes a tuple configured to identify the path, wherein the tuple includes a first IP address of the first node, a second IP address of the second node, and a path identifier of the path, wherein the path identifier of the path is a unique identifier assigned to the path, wherein the communication of the packet along the path from the first node to the second node is supported based on state information configured to map the tuple to a next hop in the set of hops of the path; and
supporting communication of a second packet along a second path from the first node to the second node in the IP network, wherein the second path traverses the set of hops, wherein the second packet includes a second tuple configured to identify the second path, wherein the second tuple includes the first IP address of the first node, the second IP address of the second node, and a second path identifier of the second path, wherein the communication of the second packet is supported based on second state information of the second path configured to map the second tuple to a next hop in the set of hops.

22. A method, comprising:
supporting communication of a packet along a path in an Internet Protocol (IP) network from a first node to a second node, wherein the path includes a set of hops, wherein the packet includes a tuple configured to identify the path, wherein the tuple includes a first IP address of the first node, a second IP address of the second node, and a path identifier of the path, wherein the path identifier of the path is a unique identifier assigned to the path, wherein the communication of the packet along the path from the first node to the second node is supported based on state information configured to map the tuple to a next hop in the set of hops of the path; and
supporting communication of a second packet along a second path from the first node to the second node in the IP network, wherein the second path traverses a second set of hops which is different than the first set of hops of the first path, wherein the second packet includes a second tuple configured to identify the second path, wherein the second tuple includes the first IP address of the first node, the second IP address of the second node, and a second path identifier of the second path, wherein the communication of the second packet is supported based on second state information of the second path configured to map the second tuple to a next hop in the second set of hops of the second path.

* * * * *